United States Patent
Reinhold et al.

(10) Patent No.: US 10,116,886 B2
(45) Date of Patent: Oct. 30, 2018

(54) DEVICE AND METHOD FOR DIRECT OPTICAL IMAGE CAPTURE OF DOCUMENTS AND/OR LIVE SKIN AREAS WITHOUT OPTICAL IMAGING ELEMENTS

(71) Applicant: JENETRIC GmbH, Jena (DE)

(72) Inventors: Joerg Reinhold, Jena (DE); Roberto Wolfer, Jena (DE); Dirk Morgeneier, Jena (DE)

(73) Assignee: JENETRIC GmbH, Jena (DE)

( * ) Notice: Subject to any disclaimer, the term of this patent is extended or adjusted under 35 U.S.C. 154(b) by 0 days.

(21) Appl. No.: 15/272,532

(22) Filed: Sep. 22, 2016

(65) Prior Publication Data
US 2017/0085813 A1   Mar. 23, 2017

(30) Foreign Application Priority Data
Sep. 22, 2015   (DE) .................. 10 2015 116 026

(51) Int. Cl.
*H04N 5/353* (2011.01)
*H04N 5/235* (2006.01)
(Continued)

(52) U.S. Cl.
CPC .......... *H04N 5/3532* (2013.01); *G06K 9/0004* (2013.01); *H04N 5/2351* (2013.01);
(Continued)

(58) Field of Classification Search
CPC .......... G01J 2003/1278; G01J 2003/468; G01J 3/0205; G01J 3/0229; G01J 3/502;
(Continued)

(56) References Cited

U.S. PATENT DOCUMENTS 4,394,773 A    7/1983   Ruell
5,230,025 A *  7/1993   Fishbine ............ G06K 9/00026
                                                      356/71
(Continued)

FOREIGN PATENT DOCUMENTS

DE      19958378 A1    11/2000
DE      69804619 T2     2/2003
(Continued)

OTHER PUBLICATIONS

Stuart Kleinfelder el al., "Integrated X-ray and charged panicle active pixel CMOS sensor arrays using an epitaxial silicon sensitive region," Jul. 1, 2002, 2002 SPIE Conference on Visualization and Data Analysis, San Jose, CA.
(Continued)

*Primary Examiner* — Michael P Stafira
(74) *Attorney, Agent, or Firm* — Patentbar International, P.C.

(57) ABSTRACT

A device and method for direct optical recording of security-related objects without optically imaging elements is disclosed. Direct optical recording of skin prints and documents, wherein interference through ambient light is excluded, is met by a sensor layer with TFT technology arranged on a substrate layer transparent at least in the visible wavelength range. Light-sensitive elements of the sensor layer have a distance from the object of less than the mean pixel spacing defined by the pixel grid and have in each instance a control of the exposure time. A primary light-emitting layer is constructed to illuminate the object by at least light portions from direction of the sensor layer through the placement surface. All layers of the layer body located between primary light-emitting layer and placement surface transmit at least portions of light in the visible wavelength range.

17 Claims, 14 Drawing Sheets

(51) Int. Cl.
*H04N 5/355* (2011.01)
*G06K 9/00* (2006.01)

(52) U.S. Cl.
CPC ....... *H04N 5/2354* (2013.01); *H04N 5/35554* (2013.01); *G06K 9/00442* (2013.01)

(58) Field of Classification Search
CPC ............ G01J 3/021; G01J 3/0237; G01J 3/18; G01N 21/255; G01N 21/64; G01N 21/6458; G01N 2201/06113; G01N 2201/0675; G01N 21/27
See application file for complete search history.

(56) References Cited

U.S. PATENT DOCUMENTS

| | | | |
|---|---|---|---|
| 5,325,442 A | 6/1994 | Knapp | |
| 6,128,399 A | 10/2000 | Calmel | |
| 6,885,439 B2 | 4/2005 | Fujieda | |
| 6,952,022 B2 | 10/2005 | Jang et al. | |
| 7,053,954 B1* | 5/2006 | Canini | H04N 5/2353 348/229.1 |
| 7,366,331 B2 | 4/2008 | Higuchi | |
| 7,379,570 B2 | 5/2008 | Shyu et al. | |
| 7,442,588 B2 | 10/2008 | Jang et al. | |
| 7,769,252 B2 | 8/2010 | Taverner et al. | |
| 8,218,068 B2 | 7/2012 | Deever et al. | |
| 8,569,671 B2 | 10/2013 | Meynants et al. | |
| 8,928,792 B1 | 1/2015 | Hynecek et al. | |
| 2003/0147550 A1* | 8/2003 | Shigeta | G06K 9/00013 382/124 |
| 2004/0228508 A1* | 11/2004 | Shigeta | G06K 9/00026 382/124 |
| 2004/0252867 A1* | 12/2004 | Lan | G06K 9/0004 382/124 |
| 2005/0105782 A1* | 5/2005 | Abiko | G06K 9/00026 382/124 |
| 2005/0105785 A1 | 5/2005 | Shigeta | |
| 2005/0169506 A1 | 8/2005 | Fenrich et al. | |
| 2005/0213173 A1 | 9/2005 | Sasaki et al. | |
| 2005/0229380 A1 | 10/2005 | Deconde et al. | |
| 2007/0252005 A1 | 11/2007 | Konicek | |
| 2008/0089563 A1* | 4/2008 | Yumoto | G06K 9/00087 382/124 |
| 2009/0232362 A1 | 9/2009 | Otsubo et al. | |
| 2012/0075432 A1 | 3/2012 | Bilbrey et al. | |
| 2012/0321149 A1 | 12/2012 | Carver et al. | |
| 2013/0119237 A1 | 5/2013 | Raguin et al. | |
| 2013/0259321 A1* | 10/2013 | Aoki | G06K 9/00885 382/115 |
| 2014/0079300 A1* | 3/2014 | Wolfer | G06K 9/00013 382/124 |
| 2015/0102449 A1 | 4/2015 | Kudo | |
| 2015/0172528 A1 | 6/2015 | Maeyama | |
| 2016/0210493 A1* | 7/2016 | Walch | G06K 9/00013 |
| 2017/0164844 A1* | 6/2017 | Yamada | A61B 5/0261 |

FOREIGN PATENT DOCUMENTS

| | | |
|---|---|---|
| DE | 102009001521 B4 | 12/2012 |
| EP | 1 318 473 A2 | 6/2003 |
| EP | 2120182 B1 | 2/2010 |
| EP | 2 372 604 B1 | 4/2013 |
| EP | 2 397 969 B1 | 4/2013 |
| WO | 2012/067409 A3 | 5/2012 |
| WO | 2014/198259 A1 | 12/2014 |
| WO | 2015/005959 A1 | 1/2015 |

OTHER PUBLICATIONS

Wikipedia Dicklyon, "Active Pixel Sensor," Jan. 25, 2015, https://en.wikipedia.org/w/index.php?title=Active_pixel_sensor&oldid=644123572.

MVP, "Reference 1 of Electronic shuttering: Rolling vs Global shutter," Mar. 8, 2015, https://fr.wikipedia.org/w/index.php?title=Rolling_shutter&oldid=112547944.

Wikipedia Squids and Chips, "Backlight," May 14, 2013, https://en.wikipedia.org/w/index.php?title=Backlight&oldid=555114488 published in May 2013.

Wikipedia The Transhumanist, "High-dynamic range imaging," Aug. 20, 2015, https://en.wikipedia.org/w/index.php?title=High-dynamic-range_Imaging&oldid=677065369.

National Semiconductor, "LM9617 Monochrome CMOS Image Sensor VGA 30 FPS datasheet," 2001, Published in http://datasheet.octopart.com/KAC-9617-Eastman-Kodak-datasheet-132362.pdf.

Kurokawa et al, Applications of Crystalline Indium-Gallium-Zinc-Oxide Technology to LSI: Memory, Processor, Image Sensor, and Field Programmable Gate Array, 5th Asia Symposium on Quality Electronic Design, IEEE, Aug. 26, 2013, p. 66-71.

Need help on auto-exposure time regarding histogram/threshold, Machine Vision Discussion Forums, Aug. 26, 2010, http://forums.ni.com/t5/Machine-Vision/Need-help-on-auto-exposure-time-regarding-histogram-threshold/td-p/1229021.

Spectroscopy Ensuring Document Security, Ocean Optics Blog, https://web.archive.org/web/20150829171223/https://oceanoptics.com/secure-important-documents.

Ramotowski, Robert, Use of Multiple Images, Lee and Gaensslen's Advances in Fingerprint Technology, Third Edition, 2012, pp. 479-481.

\* cited by examiner

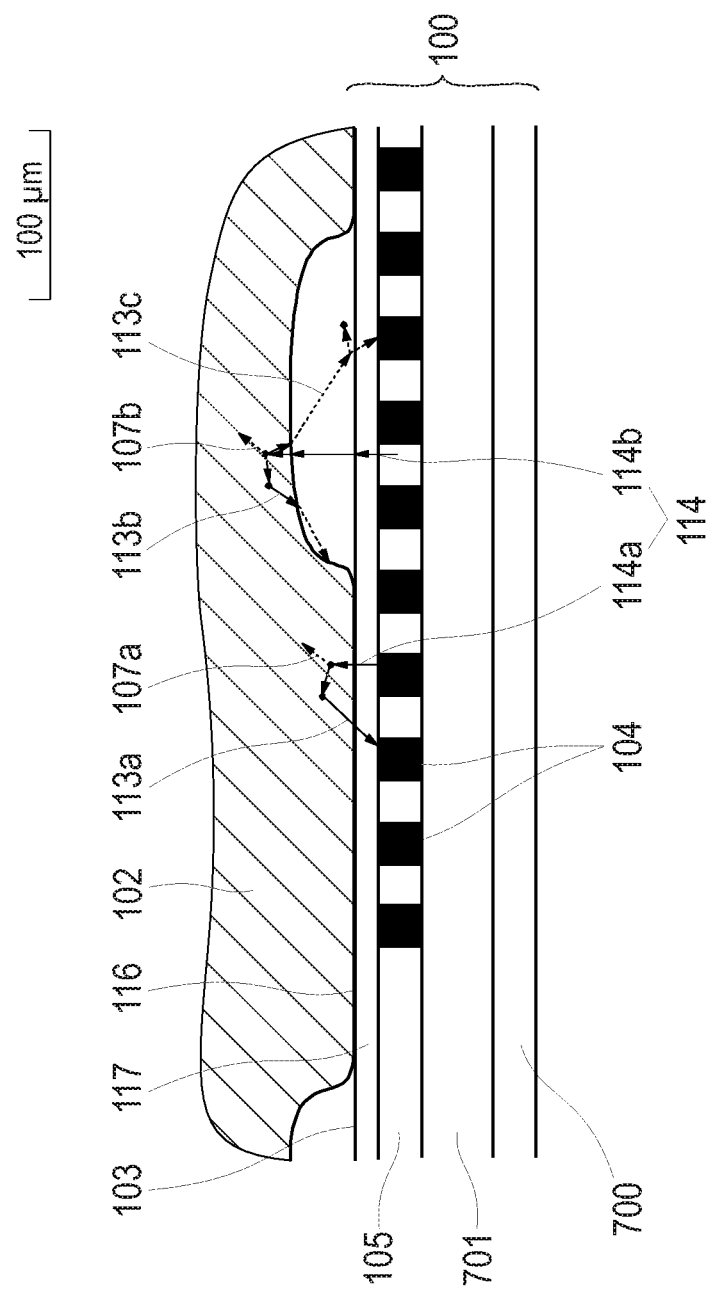

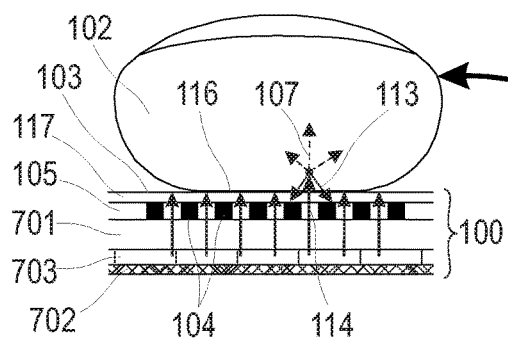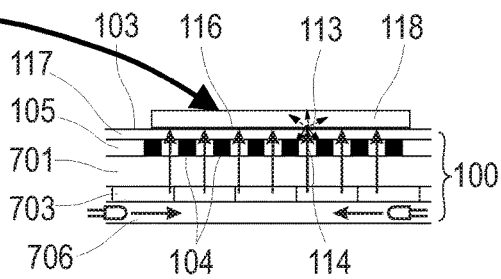
FIG 8A  FIG 8B
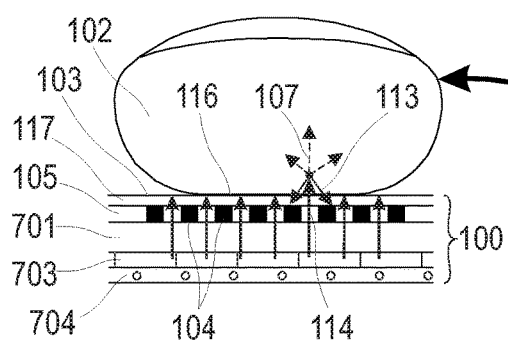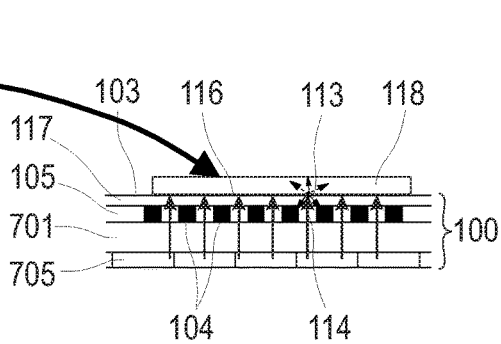
FIG 8C  FIG 8D
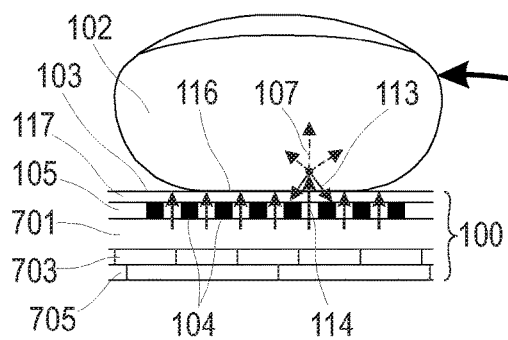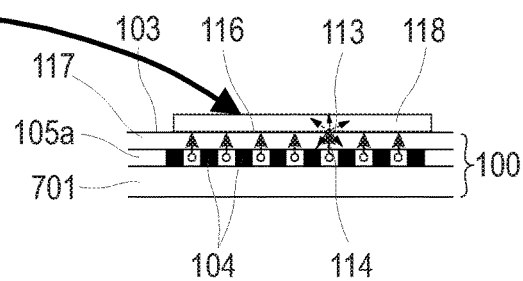
FIG 8E  FIG 8F

DEVICE AND METHOD FOR DIRECT OPTICAL IMAGE CAPTURE OF DOCUMENTS AND/OR LIVE SKIN AREAS WITHOUT OPTICAL IMAGING ELEMENTS

RELATED APPLICATIONS

This application claims priority to German Patent Application No. DE 10 2015 116 026.9, filed Sep. 22, 2015, which is incorporated herein by reference in its entirety.

FIELD OF THE INVENTION

The invention is directed to a device and a method for direct optical recording of security-related objects without optical imaging elements, comprising a placement surface for the objects, a sensor layer having light-sensitive elements in a two-dimensional, regular pixel grid being arranged under the placement surface, particularly for recording documents and fingerprints of live autopodia at frontier control points or for other mobile uses for data acquisition with personal identification.

BACKGROUND OF THE INVENTION

While fingerprints are increasingly recorded at border crossings and are compared with databases, identification documents (personal identification documents) are additionally essential for international travel.

A conventional border crossing scenario, for example, is the digital recording of a document, usually a passport or identity card. This ID document is verified, and various security features must be applied, sometimes also with illumination wavelengths and detection wavelengths in the UV and IR wavelength range outside of the visible wavelength range. Further, RFID (radio frequency identification) data stored in the document are read out, a head shot is recorded, and at least one fingerprint with high requirements for quality is acquired.

The acquired biometric data are compared with the RFID data or with the passport photograph of the personal identification document. If all of the tests are passed, the user obtains a printout of the results or—in a different scenario—a door or barrier is opened.

In the procedure described above, important goals are speed, robustness and immunity to error of the system. A system which allows skin prints as well as documents to be recorded would appreciably increase the reliability of identification of persons based on the recorded skin print and the personal identification documents presented by the person and a matching of both results with data in a database. Further, a combined system could reduce the space requirement and, by inference, the range of activity of the control authorities and, accordingly, the processing time for travelers.

However, the recording of skin prints and documents is not only a typical procedure just at border crossings. In South American banks, for example, fingerprints must be taken before an account is opened. Subsequently, the identification card (ID card) is copied and filed. At the present time, there are also two different devices required for this.

There are similar scenarios with car rentals where, in addition to the fingerprint, the identity card or, instead of the identity card, the driver's license is scanned.

Likewise, when purchasing weapons in the United States, fingerprints are required for a background check, i.e., clearance by a law enforcement agency, in addition to a recording of the driver's license which is the de facto ID card in the United States.

Background checks, for which the combination of fingerprinting and document recording is necessary, are becoming increasingly important in the United States. Further, there is a growing demand for electronic visas for travelers to the European Union.

A typical field of application in which combined skin/document scanners are demanded is checking of access authorizations for personnel in security-related areas such as airports, nuclear power plants and oil refineries by scanning fingerprints and scanning the company identification card in which these fingerprints are stored.

A further scenario is mobile application such as mobile border checks, for example, in busses and trains. In this case, it is necessary to scan the identity card, to scan at least one fingerprint and to compare the same to that in the electronic chip of the identity card. Many other areas of mobile application are conceivable. In particular, the mobile solution would benefit from a combination of light, small technology for skin recording and document recording.

All of the requirement criteria necessitate a balanced and high-quality system design. In an optical system, this means that the requirements must be satisfied not only by the recording sensor, but also by the illumination and all other components necessary for imaging.

In systems for acquiring fingerprints and handprints, there are two systems of this type to be distinguished which are used for a verification, i.e., for a one-to-one comparison with stored fingerprints of a certain person, for example for entry control and access control, and other systems which are used for identification, i.e., for searching and recording comparison data in a database administered by government authorities, for example, for border controls, aviation security and for police use.

For the latter systems, there is a great number of demands with respect to quality, resolution and fidelity to the original of the recorded images of skin textures. Further, there is a high degree of standardization based on the requirements catalog of the FBI, on the one hand to ensure indisputable identification and, on the one hand, to allow comparison between datasets which were recorded by different systems. This requirements catalog includes six important parameters. First, the systems must have a resolution of either at least 500 ppi or at least 1000 ppi. There may be no certification below these resolutions. One of the most important parameters for certification is the contrast transfer function (CTF). In this respect, the requirements catalog defines exactly the minimum value that the CTF must have in the corresponding spatial frequencies in the image. As per FBI specifications, the contrast must achieve at least 25.8% for a 500 ppi system at 10 lp/mm, while for a 1000 ppi system at 20 lp/mm, a contrast of at least 28% must be achieved. Another important parameter is the signal-to-noise ratio (SNR) which must be at least 42 dB independent from the resolution. Further requirements include low distortion of <1%, the presence of at least 200 different grayscale values and a homogeneously illuminated image field both in the near pixel environment and in the image overall. The last parameter serves as a control for preventing image falsification. This means that unusual artefacts are explicitly looked for in the images to detect image manipulation.

Currently, the optical arrangements chiefly used for acquiring fingerprints and handprints with the high quality requirements corresponding to the requirements catalog of the FBI, for example for forensic purposes or for personal identification at border crossings, are based on the principle of frustrated total internal reflection (FTIR). In this case, owing to mechanical and optical requirements, a prism is used in which the provided surface for recording the print must be larger than the required surface for recording the print. The resulting size of the prism, commonly the largest component in the recording channel, decisively influences the minimum constructional size and minimum mass of a device of this kind. But on the other hand, the high image quality allows fast and reliable recognition and identification of persons, particularly for applications in which, along with forensic accuracy (FBI requirements), a high person throughput is expected, e.g., at border controls.

The disadvantages of these types of arrangements with prisms, apart from the size and mass, are the required complex mechanical components and a complicated assembly and adjustment. A recording of documents with the beam path used for fingerprint recording and based on FTIR is impossible. Therefore, the integration of this functionality in a prism-based device is only possible with additional recording channel as is described, e.g., in EP 2 120 182 B1. For the application scenarios described above, a second device is usually added for inputting the documents. However, this results in the problem that the user often confuses the placement surfaces of the two devices, i.e., the rate of erroneous operation is high. Moreover, both variants involve an enormous expenditure in terms of cost and space.

Miniaturized arrangements with imaging optics as disclosed, for example, in U.S. Pat. No. 7,379,570 B2 generally do not satisfy FBI requirements and still limit minimization of the fingerprinting devices because of the optical beam path. Recording documents with these systems is not conceivable because FTIR is also used in this case and a further beam path for image capture again conflicts with the approach of miniaturization.

Systems without conventional optical imaging promise a smaller and lighter type of construction. Ultrasonic sensors or piezo sensors as are known, e.g., from U.S. Pat. No. 4,394,773 A, and capacitive sensors as described, e.g., in U.S. Pat. No. 5,325,442 A allow imaging of documents but do not meet the quality standards of the FBI in the case of fingerprints. Membrane keyboards as known, for example, from US 2005/0229380 A1 do not meet FBI specifications and also do not allow recording of documents.

Approaches have already been described in US 2012/0321149 A1 for an optical method that makes do without conventional optically imaging elements. The arrangement disclosed therein, in which the finger is placed directly on a transparent plate above the substrate with the sensor array records a fingerprint. As in arrangements with prisms, the brightness profile corresponding to the fingerprint comes about in that the dermal ridges (also called papillary lines) resting on the surface of the transparent glass plate or plastic plate frustrate the internal reflection of the light from the light source, whereas there is no contact between skin and surface in the dermal valleys (also called papillary body lines) and the light from the light source is internally reflected there at the surface of the transparent plate. Accordingly, a negative image of the fingerprint is formed on the light-sensitive areas of the sensor array.

This solution requires that the upper transparent plate for placement of the finger has a minimum thickness so that the light can impinge on the light-sensitive elements of the sensor array when reflected at the underside of the transparent plate. Further, it is necessary that the illumination meets certain requirements with respect to incident direction and aperture angle or collimation, which appreciably increases the technical expenditure on illumination as well as the space requirement. The constructions for illumination presented cannot be implemented for large recording surfaces for more than one or two fingers or, if so, only at considerable expense.

A further concept for a flat construction without imaging optics is described in U.S. Pat. No. 7,366,331 B2. In this case, light is coupled laterally by means of areal illumination into the finger and, from the latter, also to the deposited part of the skin. The finger is in contact with a transparent layer between finger and sensor. Accordingly, light from the dermal ridges preferably couples into this layer and can be detected by the surface sensor in this way.

This concept requires illumination wavelengths within the transparency range of the finger (from 600 nm into the NIR range and IR range) and entails substantial problems with respect to ambient light. The proposed use of spectral filters with transparent IR windows and IR illumination mitigates these problems, but there is then a lower sensitivity of conventional sensors and higher absorption of the finger, which worsens the signal-to-noise ratio. When using narrowband spectral filters, the wavelength of the illumination must be adapted correspondingly, which incurs additional expenditure. The illumination concept is not suitable for recording documents. Further, the lateral illumination causes problems with the homogeneity of the lighting; in particular, it prevents the simultaneous capture of more than one finger because the fingers would shadow one another. Therefore, this concept is only suitable for recording one finger. Further, a light shield is needed in order to prevent portions of the illumination from directly reaching the sensor. The lateral illumination and light shield increase the size of the device and make it costlier, less flexible and more susceptible to errors.

A further concept for recording fingerprints without imaging is presented in WO 2015/005959 A1. This concept uses a special transparent layer which couples in the light reflected by objects on the side facing the object and couples it out again on the opposite side. The coupled-out light is in turn geometrically imaged in a conventional manner. In principle, the recording of documents seems possible with this concept. In this concept, the conventional imaging is generally carried out by a camera which requires a corresponding geometric beam path which substantially affects the minimum constructional size of the device. In this case, illumination can be applied by projection, but then has a further substantial space requirement. However, it can also be applied as additional layer below the above-mentioned special transparent layer. In this case, the imaging is carried out by the camera through this illumination layer, which imposes high requirements on this illumination layer as a result of the transparency needed for imaging. A fundamental problem with the concept is posed by interfering ambient light which is counteracted in this case only by software (subtraction of the image background). Accordingly, protection against overexposure is not guaranteed.

SUMMARY OF THE INVENTION

It is the object of the invention to find a novel possibility for direct optical recording of skin prints and documents with the quality stipulated in accordance with FBI standards in which interference through ambient light is excluded and no passive shading measures are needed.

In a device for direct optical recording of security-related objects (without optical imaging elements), at least of one object each from the groups comprising personal identification documents, passports, driver's licenses and fingerprints or handprints, comprising a placement surface for the objects under which is arranged a sensor layer having light-sensitive elements in a two-dimensional, regular pixel grid, the above-stated object is met according to the invention in that the sensor layer is constructed in a layer body with electronics based on thin film transistor (TFT) technology, in that the sensor layer is located on a substrate layer which is transparent at least in the visible wavelength range, in that the light-sensitive elements of the sensor layer have a distance from the object to be recorded on the placement surface of less than the mean pixel spacing defined by the pixel grid, in that the light-sensitive elements have in each instance an electronic control unit within the sensor layer for controlling the exposure time, and in that a light source is constructed as primary light-emitting layer in such a way that at least portions of light of the primary light-emitting layer can illuminate the object to be recorded from the direction of the sensor layer through the placement surface, wherein all layers of the layer body which are located between the primary light-emitting layer and the placement surface transmit at least portions of light in the visible wavelength range.

The control unit for controlling the exposure time is advantageously formed as rolling shutter. However, it can also be realized in a preferred manner as global shutter.

The control unit for controlling the exposure time is advisably constructed in such a way that the exposure time of different pixels or pixel groups (for example, rows or columns) can be adjusted differently for the same recording.

A cold cathode tube or a photoluminescent foil can preferably be arranged under the sensor layer as primary light-emitting layer.

Further, the primary light-emitting layer can comprise an arrangement of two-dimensionally regularly arranged, singular light-emitting diodes from the groups comprising LEDs, OLEDs and QLEDs which is arranged below or inside the sensor layer.

It has proven advantageous when the primary light-emitting layer has a first wavelength spectrum, and at least one secondary light-emitting unit with at least one second wavelength spectrum which is not identical to the first wavelength spectrum can be switched on as an alternative to the primary light-emitting layer in order to record at least one comparison image for detecting falsification in fingerprint recordings or handprint recordings or a verification of security features with document recordings at different comparison wavelengths in each instance.

In a particularly preferred construction, the primary light-emitting layer is replaced by a light-radiating display of a mobile communications device from the group comprising smartphones, tablet computers and laptops, on which the transparent substrate layer of the layer body is placed.

In addition to the primary light-emitting layer in the form of the display of the mobile communications device, the secondary light-emitting unit is advantageously provided between primary light-emitting layer and placement surface of the layer body and advisably contains at least one light source from the group comprising LEDs, OLEDs, at least one light-conducting layer, and the secondary light-emitting unit is extensively transparent to the light of the display of the mobile communications device.

In a device for direct optical recording of security-related objects, at least of one object from the group comprising single-finger prints, multiple-finger prints or hand prints, comprising a placement surface for the objects under which is arranged a sensor layer having light-sensitive elements in a two-dimensional, regular pixel grid, the above-stated object is further met in that the sensor layer is constructed in a layer body with electronics based on thin film transistor (TFT) technology, in that the light-sensitive elements of the sensor layer have a distance from the object to be recorded on the placement surface of less than the mean pixel spacing defined by the pixel grid of the sensor layer, and in that the light-sensitive elements have in each instance an electronic control unit within the pixel grid for controlling the exposure time.

Further, the above-stated object is met through a method for generating direct optical recordings without optically imaging elements with improved contrast and/or improved dynamics of at least one each of a security-related object from the groups comprising personal identification documents, passports or driver's licenses and single-finger prints, multiple-finger prints or hand prints by the following steps:

depositing the object (102, 118), capturing an image with a predefined exposure time and storing the image, analyzing the image at least with respect to overexposure or underexposure, changing the exposure time if the analysis has determined an overexposure or underexposure by changing the shutter setting of the light-sensitive elements (104) in the sensor layer (105), again capturing image, storing image and analyzing image for overexposure or underexposure to determine whether a further iteration is needed to change the exposure time, and storing the image capture as resulting image when the image analysis makes any further change of the exposure time unnecessary.

In an advantageous manner, the illumination intensity is evaluated in addition in the image analysis and, if an underexposure or overexposure is determined, an adaptation of the illumination intensity of a primary light-emitting layer below a placement surface is carried out.

It has proven advisable that the homogeneity of the image lighting is additionally evaluated in the image analysis and a further image capture depending on determined inhomogeneities in locally adapted illumination intensity is carried out by means of a primary light-emitting layer when a local overexposure or underexposure is determined at least in portions of the image recording of the object in order to reduce or compensate for inhomogeneities.

Further, it is advantageous that the method is carried out multiple times during illumination of the object with different illumination wavelengths, and a plurality of images with different spectral range and optimized exposure time in each instance are stored individually, and the plurality of individual images are superimposed to form a multicolor total image in a further step by means of image processing algorithms.

The method can be supplemented further advantageously in that additional image captures in the UV range and IR range for checking security features of documents are recorded and stored separately.

Further, it is advisable that additional image captures are recorded during illumination with narrowband secondary light-emitting units in different spectral regions for checking falsification of fingerprints or handprints, stored as comparison images and compared to one another or to reference recordings.

The object is further met by a method for generating direct optical recordings without optical imaging elements with improved contrast and/or improved dynamics of at least one each of a security-related object from the groups comprising personal identification documents, passports or driver's licenses and fingerprints or handprints with the following steps:

depositing the object, capturing and storing at least two images with different exposure time, and superposing the images in order to calculate a resulting image with improved contrast and improved dynamic range.

The idea underlying the invention is based on the basic problem that during optical recording of fingerprints, particularly by means of direct optical methods which make do without optically imaging elements, a usually adverse influence of ambient light occurs, and the recording is impaired in quality or is falsified. Without external protective devices or protective shields, the ambient light reaches the sensor through the placement surface unobstructedly, which generally leads to overexposure at least around the deposited skin areas, but also at the edges thereof. Since most of the ambient light spectrum passes the deposited autopodia, overexposures can also occur inside the deposited skin area depending on ambient light situation. One possibility for remedying this problem is the use of spectral filters between placement surface and sensor array to limit the illumination spectrum (US 2004/0252867 A1). Accordingly, the additional recording of personal identification documents with the same sensor array would only still be possible in this limited wavelength range. In a concept of this kind, a color image of a document which can be compared to the visual impression is impossible. Also, the detection of security features requiring illumination and/or detection also in the UV wavelength range and IR wavelength range is impossible in this case.

Therefore, the concept of the invention is to use a device comprising a sensor array, based on TFT technology (see WO 2012/067409 A3, U.S. Pat. No. 6,952,022 B2, U.S. Pat. No. 7,442,588 B2) and for adaptive control of exposure time, comprising a shutter technology for detecting autopodia and documents. Electronic shutters are known chiefly from CMOS technology (see U.S. Pat. No. 8,569,671 B2) but are also already known for TFT technology (see U.S. Pat. No. 7,769,252 B2) and correspond to the prior art.

Interfering influences through ambient light are prevented through an active exposure time control in the sensor element. Electronic shutters control the exposure time for the sensor elements so that an overexposure through the ambient light can be counteracted. Accordingly, optical elements for reducing the spectral bandwidth such as are used against interfering ambient light in direct optical scanners, i.e., sensor arrays working without conventional optical imaging, are no longer needed so that light can be detected over a broad spectral range. Accordingly, in addition to the recording of skin prints, full-color recording of documents is also possible. In addition, the detection of falsified autopodia and documents is considerably facilitated through the detectability within the entire visible wavelength spectrum as well as in the UV range and IR range.

Aside from excluding interference through ambient light, this ambient light can be used exclusively or additionally through the active illumination control in a selective manner for recording skin prints of live autopodia. The concept of using ambient light as illumination source for detecting fingerprints has already been suggested in US 2013/0119237 A1. However, in this case the ambient light couples into an area adjacent to the deposited finger and is guided by reflecting, light-conducting optical elements into the layer between the placement surface and a sensor layer. With this concept, a very complicated and elaborate construction of the light-conducting element is required in order to achieve a sufficiently homogeneous illumination on the one hand and a high-quality imaging through this light-conducting element on the other hand. Smearing is inevitable in the recording quality of the fingerprint. Further, there is no sufficient protection against overexposure of the sensor in this arrangement.

Compared to conventional camera sensors, the direct sensor according to the invention has very large light-sensitive areas and, further, utilizes all of the wavelength components available in the ambient light in which it is sensitive, and there are no spectral filters which limit the wavelength spectrum. By reason of both of these characteristics, the sensor can be operated already at low light intensity. Power-saving small and light mobile systems are made possible in this way. In this scenario, an additional artificial illumination could be provided solely through the background illumination of an additional mobile device such as a smartphone or tablet. It is also possible to dispense with additional artificial light sources entirely when recording live skin prints of autopodia. In contrast to the above-cited US 2013/0119237 A1, light components are used which pass through the finger so that additional light-conducting elements are not necessary. Therefore, the sensor layer can be located within a shorter distance from the placement surface and the device according to the invention accordingly promises a higher image quality. Moreover, through active, adaptive control of the exposure time, it contains a countermeasure for preventing overexposure.

BRIEF DESCRIPTION OF THE DRAWINGS

The invention will be described more fully in the following with reference to embodiment examples. The drawings show:

FIG. 2 the optical principle underlying the invention for high-contrast, detailed recording of skin prints;

FIGS. 8a-f embodiment examples with different illumination devices which can be switched pixel by pixel or area by area;

Figure 1A:
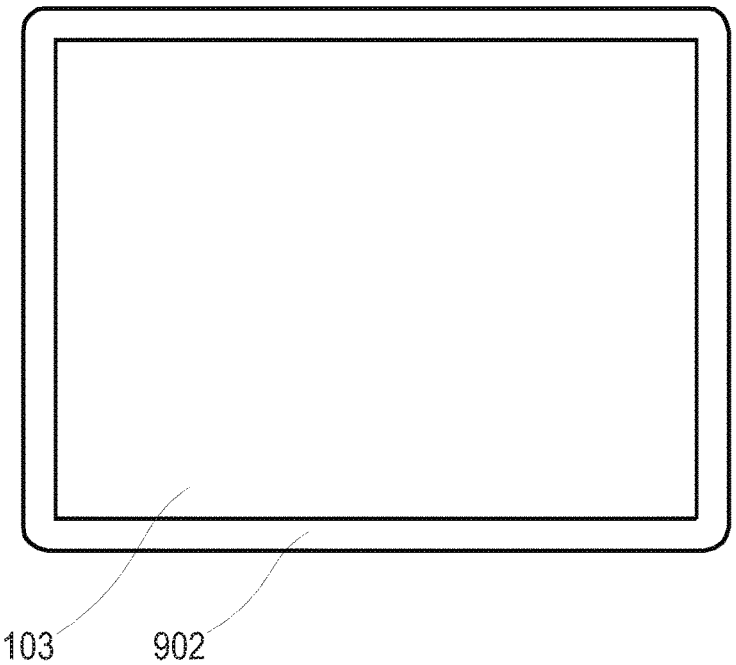
FIGS. 1a-b a schematic diagram of the basic construction of the device (2) in a top view and (b) in a side view showing the layer construction.
Figure 1B:
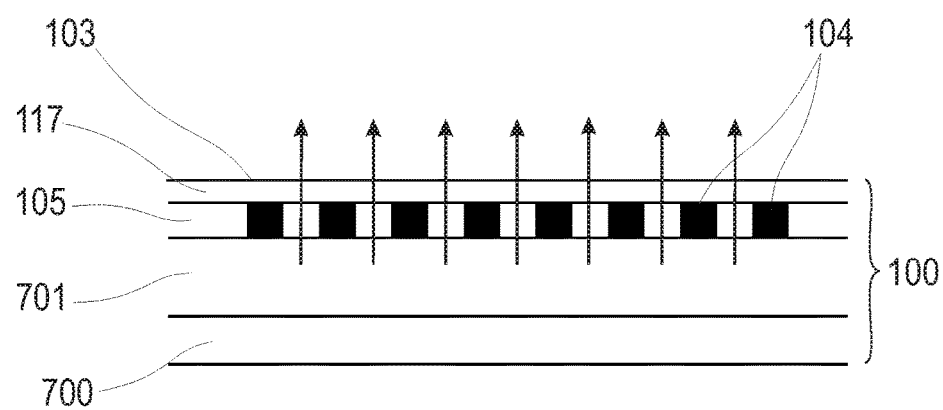

The basic design of a device for recording prints of blood-circulating skin areas of human autopodia 102 or parts thereof and for multispectral recording of documents 118 such as identity cards or personal identification is shown in two views (FIG. 1a and FIG. 1b).

DETAILED DESCRIPTION OF THE PREFERRED EMBODIMENTS

FIG. 1a shows a top view of a device for recording prints and documents 118 of the type mentioned above. This view shows a placement surface 103 and a frame 902. This is also the view chiefly seen by the user of the device. The placement surface 103 is generally the boundary surface of a protective layer 117 which protects the electronic components of a sensor layer 117 located below it from dirt and scratches. The user places the autopodia 102 or documents 118 to be recorded on the placement surface 103 for recording.

FIG. 1b shows part of a section through the device comprising a layer body 100. The upper side of the layer body 100 with the protective layer 117 forms the placement surface 103. The latter is the upper boundary surface of the protective layer 117.

The sensor layer 105 is located on the other side of the protective layer 117 remote of the placement surface 103. This sensor layer 105 contains light-sensitive elements 104 which are arranged in a first regular pixel grid. The light-sensitive elements 104 are photodiodes, for example, which can be read out within the sensor layer 105 by an electronic circuit, for example, through TFT technology and have additional electronics for controlling the exposure time. A substrate layer 701 which is transparent at least in the visible wavelength range is located under the sensor layer 105, i.e., on the side remote of the placement surface 103. The material of this layer is glass or a transparent plastic, for example. It is generally the substrate on which the electronic components of the sensor, e.g., the light-sensitive elements 104 and electronics thereof, have been applied for reading out and for controlling the exposure time and is accordingly directly connected to the sensor layer 105. The primary light-emitting layer 700 is in turn located below this transparent substrate layer 701. It emits light in the visible wavelength range and accordingly ensures that the object that has been deposited on the placement surface 103 is illuminated for image capture. Ideally, the wavelength spectrum that is generated in this primary light-emitting layer 700 is adapted to match the spectral sensitivity of the light-sensitive elements 104 in the sensor layer 105. Substantial portions of the illumination 114 of the primary light-emitting layer 700 pass through the transparent substrate layer 701, through the sensor layer 105 and through the protective layer 117 and the placement surface 103 so that they can illuminate the object for image capture.

As is shown in its basic construction in FIGS. 1a and 1b, the device according to the invention and the associated method are characterized by a combination of a plurality of direct optical recordings at different illumination settings in each instance. Accordingly, the dynamics and the signal-to-noise ratio (SNR) can be additionally enhanced. The image improvements and the possibility of using exclusively ambient light for illuminating an object to be recorded are relevant chiefly for the recording of skin areas, since documents 118 generally completely mask the ambient light and require selective or specific types of illumination.

Flexible Illumination Adjustment

In basic mode, the sensor array is read out at a fixed repetition rate. This results in the integration time for each of the light-sensitive elements 104, i.e., that time interval in which each of the light-sensitive elements 104 receives the light in an integrating manner. As a result of a controlling of the exposure time which is realized in the simplest case by an additional transistor in the pixel circuit, it is possible to read out every pixel before this integration period expires. Therefore, at a fixed refresh rate, the sensitivity of the sensor can be adjusted depending on the situation.

Different situations for a recording sensor for combined recording of skin prints and documents include:

(i) the recording and readout of high-contrast skin print images (in this case, the ambient light is added to the "artificial" illumination optionally provided from the device), (ii) the color recording and readout of documents 118 takes place through a plurality of recordings at different wavelength ranges, the different wavelength ranges are provided through the illumination located in the device, recordings of different wavelength ranges are optionally superimposed by software in a weighted manner to form a color image, (iii) the multispectral (at defined wavelengths) recording and readout of security features of documents 118, wherein the document 118 is illuminated, for example, in the IR range and/or UV range and the sensitivity of the sensor must be adapted depending on its spectral sensitivity and the spectral illumination intensity, (iv) narrowband recording at different wavelengths and readout of skin print images for live recognition (anti-spoofing) in which the different sensitivity of the sensor and the different illumination intensity of the light source(s) must be compensated.

In addition to the different recording requirements mentioned above, the ambient light situation plays an important part and must be detected preferably with every individual recording of skin prints in a preceding calibration image recording and taken into account in a corresponding manner. This can be carried out on the one hand by utilizing the ambient light or on the other hand by suppression or compensation by means of the shutter-controlled exposure time adaptation.

FIG. 2 shows the principle upon which the invention is based for generating a high-contrast recording of handprint details with a contrast of >0.4. An autopodium 102 contacts the placement surface 103 in region 116. Portions of light of the illumination 114 of the primary light-emitting layer 700 pass through the transparent substrate layer 701, through the sensor layer 105, through the protective layer 117 and through the placement surface 103.

An illumination portion 114a of the illumination light 114 from the primary light-emitting layer 700 serves to illuminate the dermal ridges, couples into the skin via the dermal ridges (papillary lines) and generates (i) scatter light 107a which is coupled in via the dermal ridges, scatters forward and is not directly detected by the light-sensitive elements 104 of the sensor layer 105, and (ii) a detected illumination portion 113a which is scattered into the dermal ridges, scatters backwards, couples out of the skin, passes through the placement surface 103 and protective layer 117 into the sensor layer 105 and is detected therein by the light-sensitive elements 104.

Another illumination portion 114b of the illumination light 114 from the primary light-emitting layer 700 serves to illuminate the dermal valleys and generates (i) scatter light 107b which is coupled in via the dermal valley, scatters forward and is not directly detected by the light-sensitive elements 104, and (ii) an illumination portion 113b which is scattered in the dermal valley and not detected and which is scattered backwards in the region of the dermal valley (papillary body line), is coupled out of the skin and coupled in again at another place owing to the out-coupling angle and the geometry of the dermal valley and is accordingly not directly detected by the light-sensitive elements 104, and (iii) an illumination portion 113c which is scattered in the dermal valley and detected and is scattered backwards in the dermal valley, coupled out of the skin into the air volume surrounding the dermal valley and placement surface 103, and passes through the placement surface 103 and protective layer 117 into the sensor layer 105, where it is detected through the light-sensitive elements 104.

A portion of the scatter light 107a coupled in via a dermal ridge serves to illuminate the dermal ridges, and portions of the scatter light 107b coupled in via a dermal valley are chiefly scattered forwards and no longer pass out of the skin in direction of the sensor layer 105. Other portions of the light 113a scattered into the dermal ridges are scattered backwards, couple out of the skin, pass through the placement surface 103 and the protective layer 117 into the sensor layer 105 and are there detected by the light-sensitive elements 104. Since the skin and the protective layer 117 have similar refractive indices, there are hardly any reflections at this interface. Another portion of the light 113b scattered into the dermal valleys is backscattered, couples out of the skin and couples in again at another place owing to the out-coupling angle and the geometry of the dermal valley. Accordingly, this light portion 113b cannot be directly detected in the sensor layer 105. A final portion of the light 113c backscattered in the dermal valley couples out of the skin into the air volume surrounding the dermal valley and placement surface 103. This light portion 113b then passes through the placement surface 103 and protective layer 117 into the sensor layer 105.

When passing through the interface between the skin of the dermal valley and the air volume in the dermal valley and when passing through the interface between the air volume in the dermal valley and the protective layer 117, reflections occur due to the different refractive indices of skin (around 1.5), air (around 1.0) and protective layer 117 (around 1.5). As a result of these reflections in the dermal valley and the scattered, undetected illumination portion 113b, the detected illumination portion 113a scattered in the dermal ridges is substantially greater than the illumination portion 113c which is scattered and detected in the dermal valleys. The scatter problem in its entirety can be calculated for different refractive indices of the protective layer 117 and wavelengths of the primary light-emitting layer 700. A contrast between dermal ridge and dermal valley of 0.5 (±0.1) results for the entire optical wavelength range.

Figure 3A:
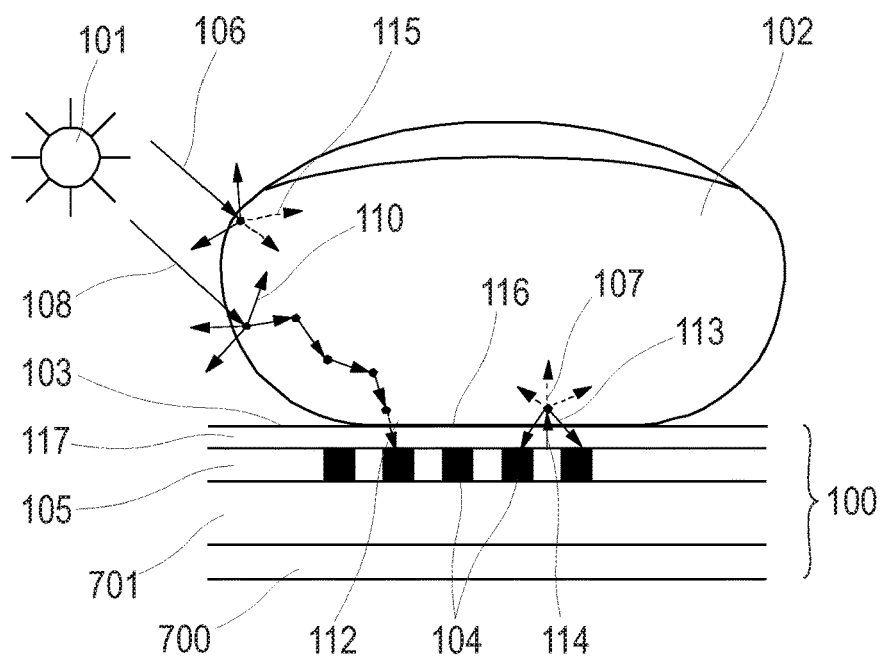
FIGS. 3a-b a diagram showing the principal light paths of ambient light and light of a primary light source of (a) a live autopodium and (b) a document as alternative object to be deposited and recorded.

FIG. 3a shows the basic operation of the device according to the invention for recording skin print images of live autopodia 102 with exposure to ambient light 101.

In this case, the area 116 of the placement surface 103 contacted by the object is the skin area of an autopodium to be recorded.

The illumination light 114 of the primary light-emitting layer 700 generates light of the illumination 107 that is scattered in the skin. The backscattered portion of illumination light 113 that is detected passes through the placement surface 103 and the protective layer 117 into the sensor layer 105, where it is detected by the light-sensitive elements 104. Details for the high-contrast image capture of skin print details are described in the text referring to FIG. 2.

Apart from the illumination light 114 of the primary light-emitting layer 700, the autopodia 102 are illuminated through the ambient light 101. Portions 106 of the ambient light 101 with wavelengths of less than 600 nm generate scattered ambient light 115 with wavelengths of less than 600 nm and are already absorbed shortly after penetrating into the skin. The penetration depth for light with wavelengths of less than 600 nm sometimes amounts to appreciably less than 0.5 mm depending on specific wavelength.

Light portions in the visible spectral range of >600 nm are scattered in the skin and tissue with substantially lower absorption. The penetration depth for visible light with wavelengths of greater than 650 nm is up to 0.3 cm depending on wavelength. Accordingly, portions 108 of the ambient light 101 with wavelengths of greater than 600 nm can generate the scattered ambient light 110 with wavelengths of greater than 600 nm, pass partially through the deposited autopodium 102, partially traverse the placement surface 103 and the protective layer 117 and arrive in the sensor layer 105 and are detected by the light-sensitive elements 104.

An overexposure when the intensity of ambient light 101 is too high (e.g., in direct sunlight) is counteracted by the electronically controllable exposure time in the control of the light-sensitive elements 104 in the sensor layer 105.

The exposure time is adapted to achieve optimum image quality, particularly the optimum grayscale value distribution in the image.

Figure 3B:
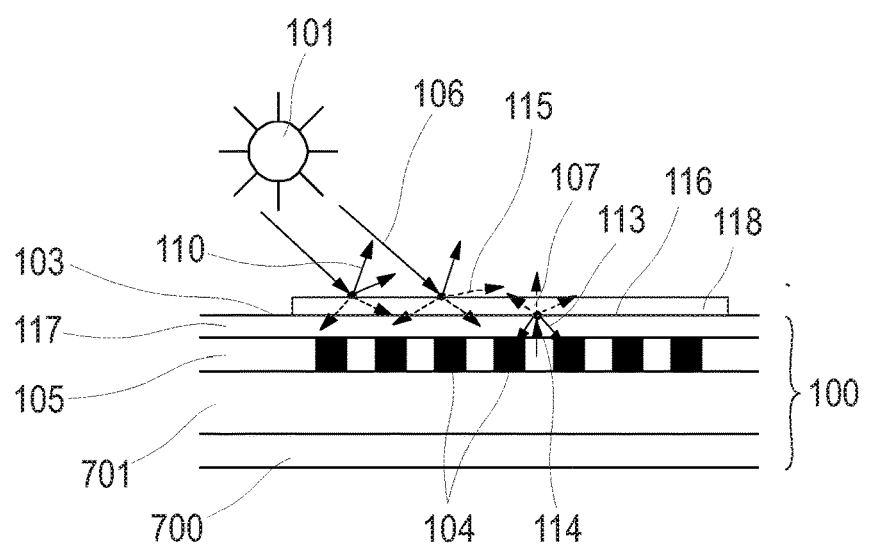

FIG. 3b shows the basic functioning of the device according to the invention for recording a document 118 under exposure to ambient light 101.

In this case, the area 116 of the placement surface 103 contacted by the object is the area of the document 118 to be recorded.

When a document 118 is located on the placement surface 103, the illumination light 114 of the primary light-emitting layer 700 generates light from illumination 107 that is scattered on the side of the document 118 facing the placement surface 103. The backscattered portion of illumination light 113 which is detected couples through the placement surface 103 and protective layer 117 into the sensor layer 105, where it is detected by the light-sensitive elements 104. As used herein, backscattering also means specular reflection in specific cases.

In addition to illumination light 114 through the primary light-emitting layer 700, the document 118 is also illuminated by the ambient light 101. Portions 106 and 108 of ambient light 101 with wavelengths of less than 600 nm and greater than 600 nm generate scattered ambient light 115 and 110 with wavelengths of less than 600 nm and greater than 600 nm on the side of the document 118 remote of the placement surface 103. The penetration depth for light in typical materials of a document 118 such as paper or plastic is so slight that typically no portions of the ambient light 101 pass through the document and can be detected by the light-sensitive elements 104.

If portions of ambient light 101 nevertheless pass through the document 118, an overexposure with excessive intensity of the ambient light 101 (e.g., in direct sunlight) is counteracted by the electronically controllable exposure time in the control of the light-sensitive elements 104 in the sensor layer 105.

The exposure time is adapted to achieve optimum image quality, particularly optimum grayscale value distribution in the image.

The direct recording of skin prints of live autopodia 102 and documents 118 is carried out without imaging elements in a highly resolving manner under the condition that the distance between placement surface 103 and light-sensitive elements 104 of the sensor layer 105 is less than the mean pixel spacing defined by the pixel grid. This criterion is necessary because the CTF worsens with increasing distance due to the propagation of light between placement surface 103 and sensor layer 105.

Figure 4:
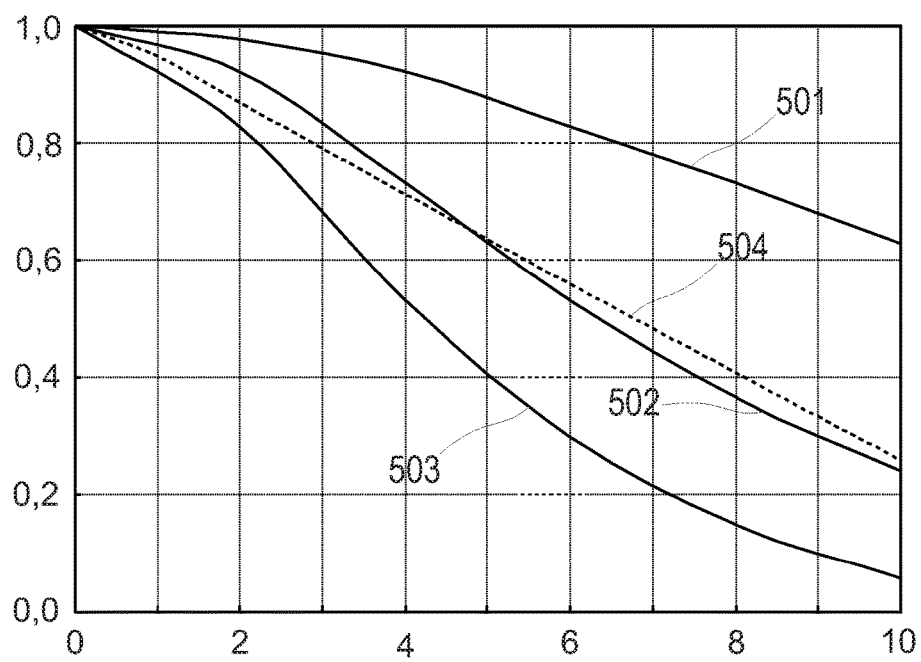
FIG. 4 a typical CTF as function of the spatial resolution (lp/mm) for different distances between the object to be recorded and the light-sensitive elements.

By way of example, the CTF for a distance of 20 µm 501, a distance of 40 µm 502 and a distance of 60 µm 503 is shown in FIG. 4. The spatial resolution is plotted on the abscissa in line pairs per millimeter (lp/mm), and the contrast (Michelson contrast) is plotted on the ordinate. The FBI requirements 504 with respect to CTF for a 500 ppi system are also shown. Based on the Nyquist theorem, a 500 ppi system requires a period, as a mean pixel spacing, of at least 50.8 µm. With this value as distance between placement surface 103 and sensor layer 105, the FBI requirements 504 can no longer be met. Broadly speaking, it must be the case that the distance between the placement surface 103 and the light-sensitive elements 104 in the sensor layer 105 is less than the mean pixel spacing.

Image Capture with Adapted Exposure Time

Figure 5:
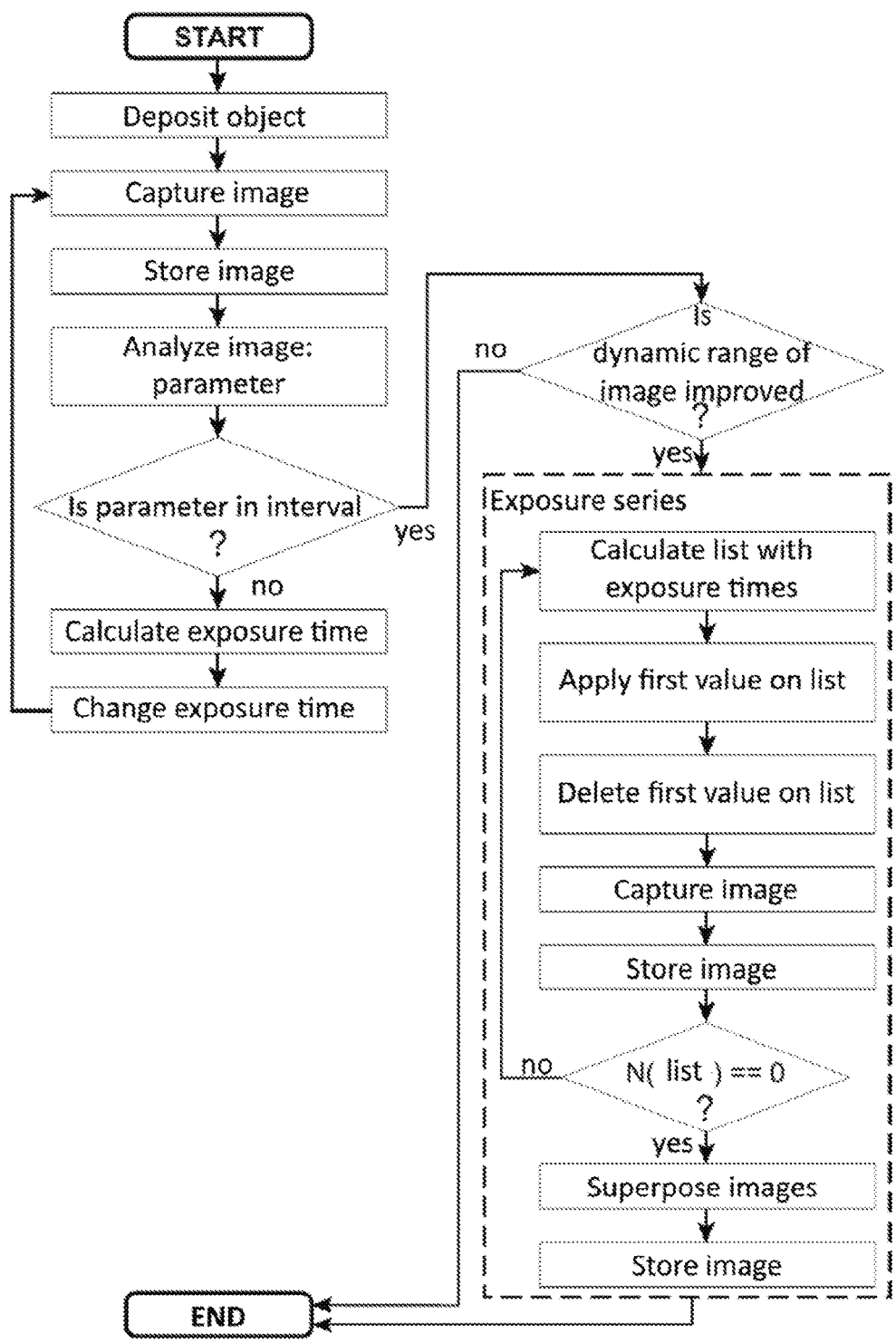
FIG. 5 the basic method for capturing an image with optimized exposure time with the device according to the invention.

FIG. 5 shows the basic method for recording a security-related object such as a skin print of a live autopodium 102 or a document 118. The device is in sleep mode before starting. The method commences with Start, whereupon the device switches into standby mode. This can take place automatically through proximity detection or through manual input. After the object is placed on the placement surface 103, the device switches automatically into record mode by detecting contact between object and placement surface 103 or by manual input, and the image capture is carried out. In so doing, the signal of the light-sensitive elements 104 is read out. The light-sensitive elements 104 are controlled, for example, by means of TFT (thin film transistor) technology and are read out by means of further integrated electronics. The subsequent image storage moves the read-out data into a local storage formed within the device or via a computer interface, e.g., USB, or a wireless connection, for example, Bluetooth or WLAN, into a storage located in an external computer or mobile device such as, e.g., a tablet computer or smartphone. Next, the recorded and stored image is analyzed. This takes place either inside the device, for example, through at least one internal computing device (for example, a freely programmable logic circuit [FPGA], signal processor, microcontroller). During the image analysis, one or more parameters is determined to provide conclusiveness about the quality of the recording on the one hand and to change by adapting the exposure time on the other hand. For example, such a parameter can be generated from the grayscale value distribution, for example, via a grayscale histogram. If the gray values in the image are distributed substantially below a determined threshold value, the image is underexposed. If the gray value frequency is distributed rising to the maximum, the image is overexposed. A defined range therebetween is the correct exposure. This state of affairs can be abstracted to one or more parameters. A check is made as to whether this parameter is or is not in the interval. If the parameter is in the interval, i.e., if the exposure time was correct, the process is concluded with step "End". The device switches out of record mode into standby mode in case further recordings are to be carried out or into sleep mode. The data are still located in the storage and can be used again.

In case of a negative response to the query "is the parameter in the interval?", the parameter is used to calculate a new exposure time. For example, if the captured image has been overexposed, a smaller value is calculated for the exposure time. The new exposure time that is accordingly determined is transmitted to the sensor electronics and accordingly changed for the next image capture. A new image capture, image storage and image analysis are carried out. The previously recorded image is typically overwritten by the new image. Now if the parameter is in the interval, the process is terminated; if not, a further iteration is carried out. Typically, a termination criterion is defined. For example, this termination criterion can end the process after a certain number of iterations even if the parameter in the interval is not reached. The user can then obtain the information that the quality preset was not achieved.

The described method can optionally be expanded such that, instead of the process step 'End', the optimum exposure time is subjected to a further calculation in which a list of at least two exposure times is determined with at least one exposure time that is shorter than the previously calculated optimum exposure time and one exposure time that is longer than the previously calculated optimum exposure time. The exposure time of the sensor layer 105 is then set to the first value on the list. Next, an image is captured and stored. The first value on the list is deleted. If there is a further value on the list, the exposure time is again set to the new first value on the list. Image capture and storage are carried out again. When storing, the images are not overwritten. This part of the process continues until there are no more values on the list and the final image is stored. The images are then superimposed by means of a software algorithm resulting in an image with a particularly high dynamic scope. This image is stored and is accordingly available for further use.

The adjustment of exposure time in the method described in FIG. 5 is carried out electronically by means of TFT technology. The light-sensitive element 104 in the sensor layer 105 is controlled and read out by means of leads and above-mentioned TFT technology. For this purpose, in the simplest case, a transistor is needed for every light-sensitive element 104. The simplest form of exposure time control, rolling shutter, is made possible by adding a further transistor for moving electrons and the corresponding circuit. Rolling shutter is a method of exposure that is largely used in CMOS sensor technology but which is also suited to TFT technology. In contrast to global shutter, exposure takes place not as a "one-time" simultaneous exposure, but rather in a gradated sequence. When initiated, the rows are exposed one after the other, i.e., row by row. In so doing, depending on exposure time, overlapping may result. When the final image row has been completely exposed, the next image acquisition starts again from the beginning at the first row. As a result of the simple circuit with only two transistors, there is less heat and power consumption (this is important precisely for mobile application) and the ambient noise is appreciably lower than in global shutter, in which the four to five transistors produce comparatively high ambient noise and extensive heat. On the other hand, in rolling shutter, especially with moving objects, distortion often occurs to a degree exceeding acceptable levels in certain applications. This distortion occurs because the object or camera continues to move within the time frame in which the row-by-row exposure takes place. When the image data are read out, the exposed rows are compiled again in the same sequence to form a total image. Owing to the time delay during the exposure of the individual rows, this time lag is also visible in the compiled image in the form of distortion. This effect is known as the rolling shutter effect. Aside from the exposure time, the speed of the sensor also plays a part. It determines how fast the rows open and close again. The effect is less pronounced in a fast sensor with a frame rate of a maximum of 60 frames per second than in a slow sensor with, for example, a maximum of 15 frames per second. For static recording, for example, of fingerprints or documents, the dynamic distortions of a rolling shutter are negligible and are outweighed by the advantage of low ambient noise. When recording rolled fingerprints, implementing exposure time adaptation via a global shutter is appropriate because this is a dynamic process and, therefore, unacceptable distortion could occur.

Figure 6:
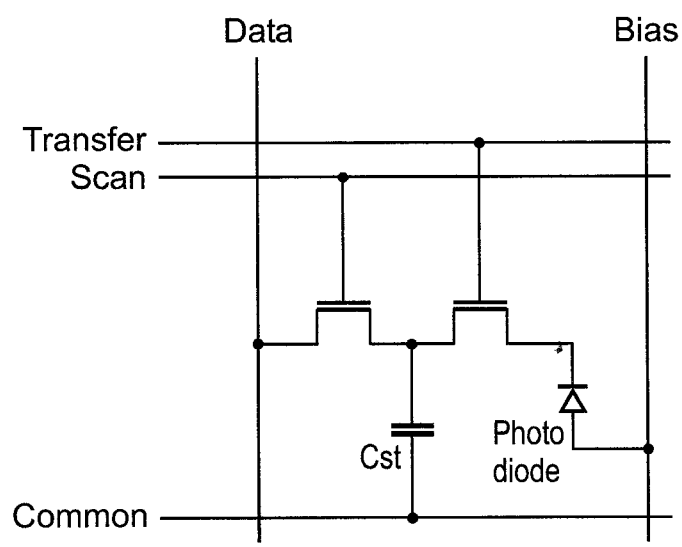
FIG. 6 an embodiment example of the invention for realizing an electronic exposure time adjustment.

FIG. 6 shows a preferred embodiment example for an electronic circuit of a pixel in the sensor layer 105. The light-sensitive element 104 is a photodiode in this case. Two transistors are shown: one transistor switches the photodiode corresponding to the timing, and the other transistor performs an additional switching for readout and accordingly makes it possible to decrease the time interval in which light is collected by the photodiode. Accordingly, the exposure time control is realized in conformity with the rolling shutter principle.

Figure 7A:
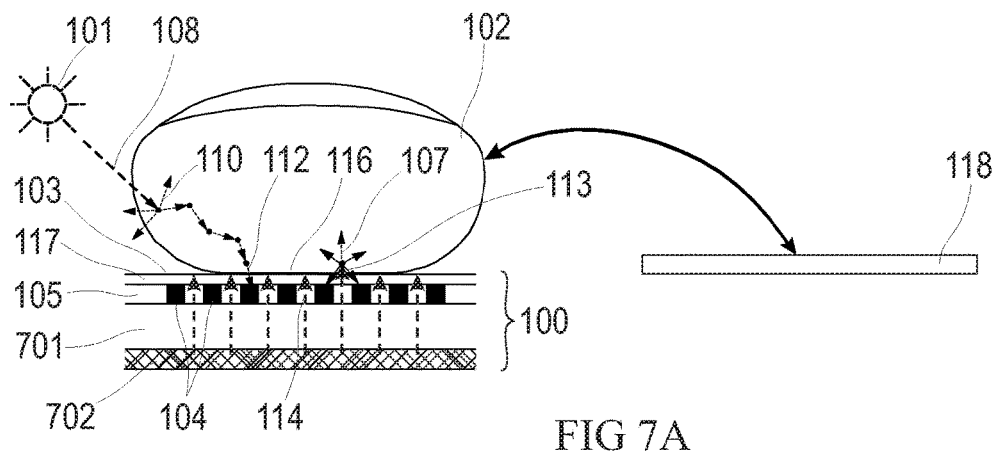
FIGS. 7a-c embodiment examples with various homogeneous illumination devices.
Figure 7B:
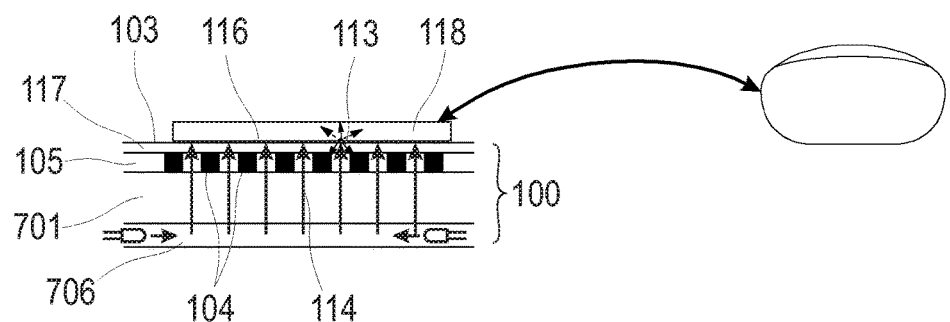
Figure 7C:
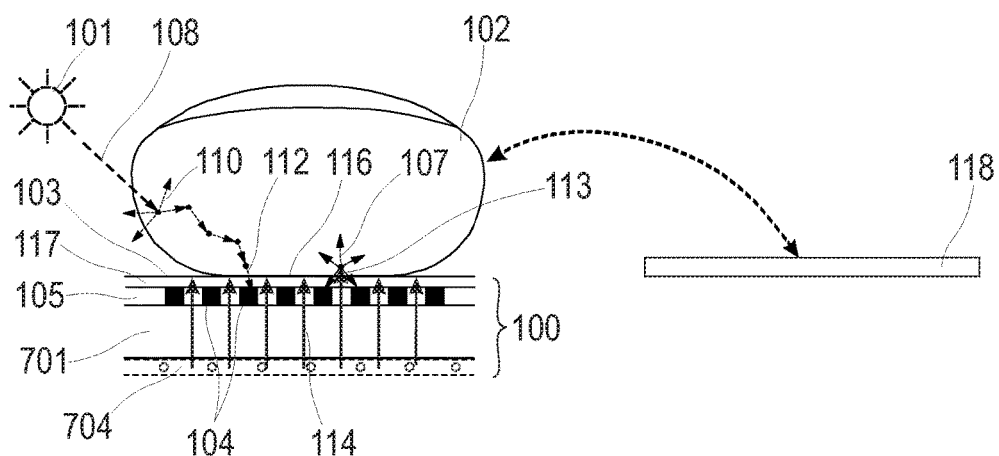

The illumination of the object 102 or 118 is carried out via the primary illumination layer 703 shown in FIG. 1b. FIG. 7a, FIG. 7b and FIG. 7c show preferred embodiment examples in which the object is illuminated with illumination 114 which is as homogeneous as possible. This homogeneous illumination 114 forms the primary light-emitting layer 700 shown in FIG. 1b. The object can be either a document 118 or an autopodium 102. If the object is an autopodium 102, the illumination of the object can also be carried out exclusively through the ambient light 101. In typical lighting situations, for example, direct room ceiling lighting or direct sunlight, primarily spectral components 108 of the ambient light 101 with wavelengths of greater than 600 nm generate a sufficiently large proportion 112 of the ambient light 101 to be detected.

FIG. 7a shows a preferred embodiment example in which the primary light-emitting layer 700 of the basic layer construction known from FIGS. 1A-1B comprises photoluminescent foil 702.

FIG. 7b shows a preferred embodiment example in which the primary light-emitting layer 700 of the basic layer construction known from FIG. 1b comprises a light-conducting layer 706 having LEDs or OLEDs and additional optical elements such as waveguides, optical gratings, mirrors and diffusors. The additional optical elements distribute the light of the LEDs or OLEDs as homogeneously as possible in the primary light-emitting layer 700 and ensure that the illumination light 114 of the primary light-emitting layer 700 passes through the entire placement surface 103 with the same intensity as far as possible.

FIG. 7c shows a preferred embodiment example in which the primary light-emitting layer 700 of the basic layer construction known from FIG. 1b is a background illumination such as is known from flat panel displays which generates its light by means of cold cathode tubes 704. Diffusors or light-conducting or reflecting elements are typically provided for homogenizing and directed radiation.

Adapted Illumination for Image Optimization and Color Recording

The adaptation of the exposure time serves primarily to make the light-sensitive elements 104 of the sensor layer 105 less sensitive when the intensities of the ambient light 101 are too high so that the sensor layer 105 is not overdriven during the image capture because image information is lost when this happens.

Adaptation of the exposure time in the form of (i) structured illumination and (ii) adaptive adjustment of the illumination intensity can further increase resistance to interfering influences through ambient light and can enhance the quality of the image capture. In addition, a multicolor recording of objects, particularly color image recordings with documents, is made possible through (ii) adaptation of the illumination color (wavelength-limited spectral ranges).

FIGS. 8a to 8f show particularly preferred embodiment examples in which the object is illuminated by an illumination 114 which can be switched on and off locally. This allows structured illumination which can facilitate detection of falsification and improve image quality. Further, it makes it possible to display information directly on the placement surface 103 and, therefore, makes possible an intuitive and interactive user interface.

This light-emitting layer which can be switched on and off locally forms the primary light-emitting layer 700 shown in FIG. 1b. The object can be either a document 118 or an autopodium 102.

FIG. 8a, FIG. 8b, FIG. 8c and FIG. 8e, respectively, show the device according to the invention in which the structured illumination is realized through a layer 703 which locally switches with respect to transmission, for example, through a switchable liquid crystal layer. In this case, a homogeneous background illumination is necessary because the locally switching layer 703 itself generates no light. This background illumination is arranged below the locally switching layer 703, i.e., on the side remote of the transparent substrate layer 901.

As is shown in FIG. 8a, the background illumination can be a photoluminescent foil 702 or, as is shown in FIG. 8b, a light-conducting layer 706 comprising OLEDs or LEDs and beam-shaping elements and waveguide elements (see FIG. 7b), or cold cathode tubes 704 (see FIG. 7c) or (see FIGS. 8d and 8e) a two-dimensionally active LED illumination arrangement 705 (e.g., a matrix).

In the embodiment examples shown in FIG. 8d and FIG. 8f, there is no need for a locally switching layer 703 combined with a background illumination. In this case, the layer 703 that can be switched on and off has light-emitting LED or OLED elements.

FIG. 8d shows the primary light-emitting layer 700 implemented as LED matrix or OLED matrix 705.

FIG. 8f shows an embodiment example in which the primary light-emitting layer 700 is constructed as active LED matrix or OLED matrix 705 inside the sensor layer 105 as combined transmitter/receiver layer 105a. The singular light sources are arranged in a second grid which is offset relative to the grid of light-sensitive elements 104.

Figure 9A:
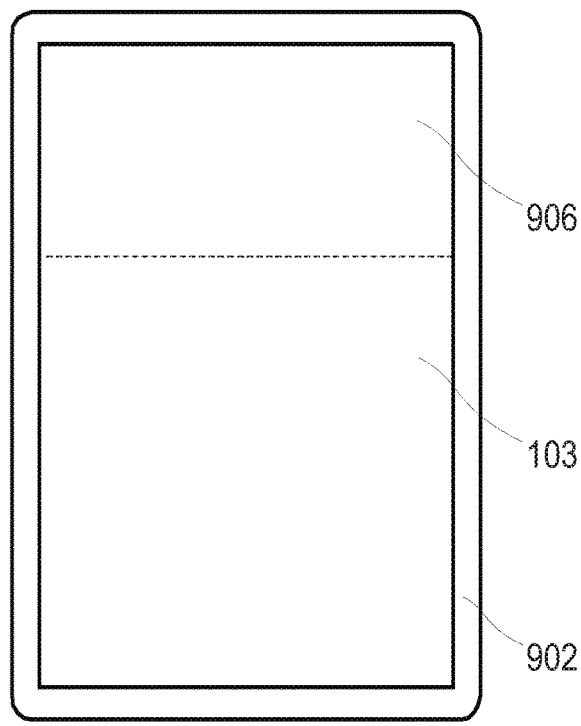
FIGS. 9a-c show preferred embodiment examples with LCD as illumination, wherein a partial area of the LCD is covered by the sensor according to the invention.
Figure 9B:
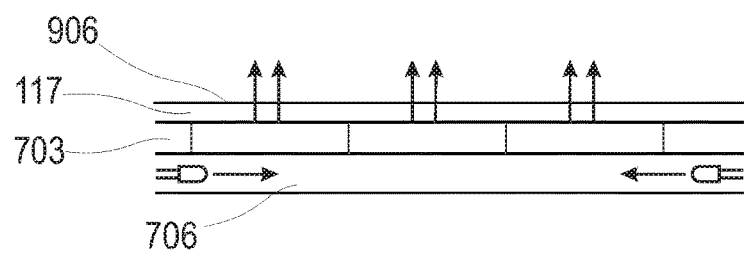
Figure 9C:
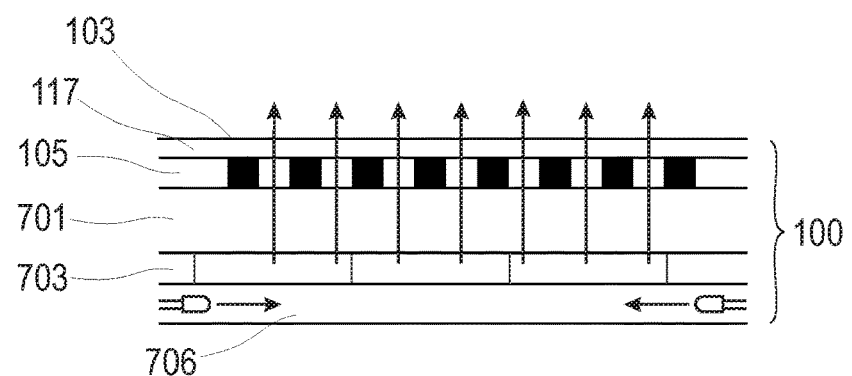

FIG. 9a, FIG. 9b and FIG. 9c show a particularly preferred embodiment example. In this case, the primary light-emitting layer 700 is realized by a locally switching layer 703 in conjunction with a light-conducting layer 706, see FIG. 8b. On the one hand, this makes possible a direct display of information and an interactive and intuitive user interface directly on the placement surface 103, and on the other hand there is, besides this, a display surface 906 for additionally displaying information. Further, the display surface 906 can be optionally outfitted with touch function, for example, for entering signatures.

FIG. 9b shows the layer construction which is terminated by the display surface 906. It comprises the light-conducting layer 706, the locally switchable layer 703, the protective layer 117 and the placement surface 103, i.e., it has no sensor layer 105. FIG. 9c shows the layer construction which is terminated by the placement surface 103 (see FIG. 8b).

Figure 10:
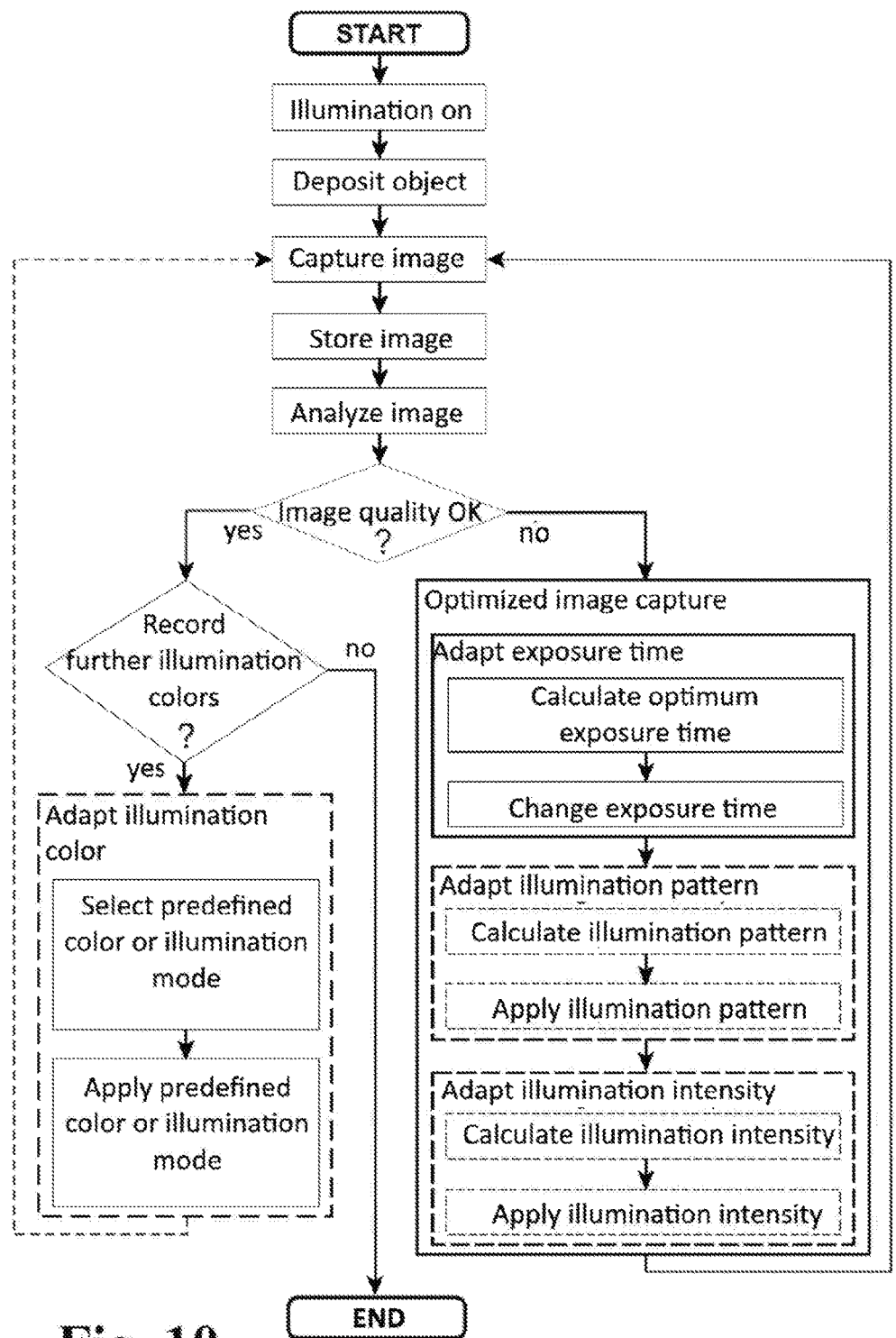
FIG. 10 a preferred method in which, in addition to the exposure time, the illumination pattern and the illumination intensity are also adapted for image capture.

FIG. 10 shows, as preferred embodiment example, a method for recording a security-related object such as a skin print of a live autopodium 102 or a document 118. In addition to the adaptation of the exposure time (by controlling the shutter pixels of the sensor layer 105), the illumination pattern (as two-dimensional intensity distribution) and the illumination intensity (in the form of total brightness) can be adapted. The basic process flow is shown in FIG. 5. The two latter adaptations can proceed optionally and in any sequence; ideally, they cooperate with the exposure time control and are matched to one another to obtain the best results. The optimized image capture can take place iteratively, see FIG. 5.

(i) Adapt Illumination Pattern

The adaptation of the illumination pattern presupposes a device with illumination that can be switched on and off locally as is shown in the examples in FIGS. 8a-f. In this method, an inhomogeneous illumination is selectively applied to locally compensate for inhomogeneities in the image, for example, interfering effects of inhomogeneous ambient light 101. To this end, the image background is calculated from the stored image. By "image background" is meant the brightness curve behind the detail structures. With fingerprints, this means that the papillary lines or the fine images of the ridges and valleys of the fingerprint are removed from the image. A closing filter, for example, i.e., a combination of minimum filters and maximum filters, can be used for this purpose. In general, the illumination array has at least a different pixel count and a different brightness value range than sensor layer 105. The stored image is adapted to the technical particulars of the illumination matrix. For example, the adaptation involves image processing algorithms such as scaling, offset and inversion. The specific propagation characteristic of the light in a specific object is taken into account through additional algorithms on the image. After the illumination pattern is calculated, the primary illumination layer 703 is driven by it, i.e., the illumination pattern is applied.

(ii) Adapt Illumination Intensity

The adaptation of the exposure time serves primarily to make the light-sensitive elements 104 of the sensor layer 105 less sensitive when the intensities of the ambient light 101 are too high so as not to overdrive the sensor layer 105 during the image capture because image information is lost when this happens. On the other hand, the adaptation of the illumination pattern serves to achieve a better image quality because the image background is homogenized in this way and the image content is not corrupted.

In contrast to the above-mentioned quality features, the adaptation of the illumination intensity is provided in particular at low intensities of the ambient light 101. In case the exposure time is already set to the maximum, for example, and the gray value histogram of the stored image nevertheless shows an underexposure, the illumination intensity can be increased as a whole through corresponding control of the primary light-emitting layer 700.

(ii) Adapt Illumination Color

On the one hand, the adaptation of the illumination color can serve to optimize the image quality. An illumination color that is favorable for image capture can be adjusted depending on the color of the object, i.e., particularly based on its spectral characteristics. On the other hand, it is possible to generate genuine color images through a plurality of recordings of different colors and to superpose them.

FIG. 10 shows the rough process flow. In this case, when checking if the parameter is in the interval, a list of illumination colors is also run through in addition to the image optimization parameters. The first item on the list is deleted after every image capture so that a plurality of recordings which were taken at different spectral intervals are stored at the end. At the conclusion, these recordings are superposed through established software algorithms with corresponding recalculation to the required color channels so that a genuine color image results. In particular, the recording of color document images is made possible in this way.

It is a prerequisite for generating color images that the device contains a primary light-emitting layer 700 which permits adjustable illumination colors. This can be realized, for example, through a locally switching layer 703 (for example, through a switchable liquid crystal layer) with various color filters (e.g., red filters, green filters and blue filters) on the switchable segments (pixels) thereof and a corresponding broadband background illumination. The combination of these components can be constructed, for example, as LCD (liquid crystal device).

Embodiment examples are shown in FIGS. 8a-8c and FIG. 8e with different background illuminations in each instance by changing the emission principle of the light-emitting layer 700. Another possibility for implementation is the use of a two-dimensional LED arrangement or OLED arrangement 705 with differently colored LEDs or OLEDs as is shown in FIG. 8d, or the use of differently colored LEDs or OLEDs in a combined transmitter/receiver layer 105a as is shown schematically in FIG. 8f.

(iv) Detection of Falsification

Figure 11A:
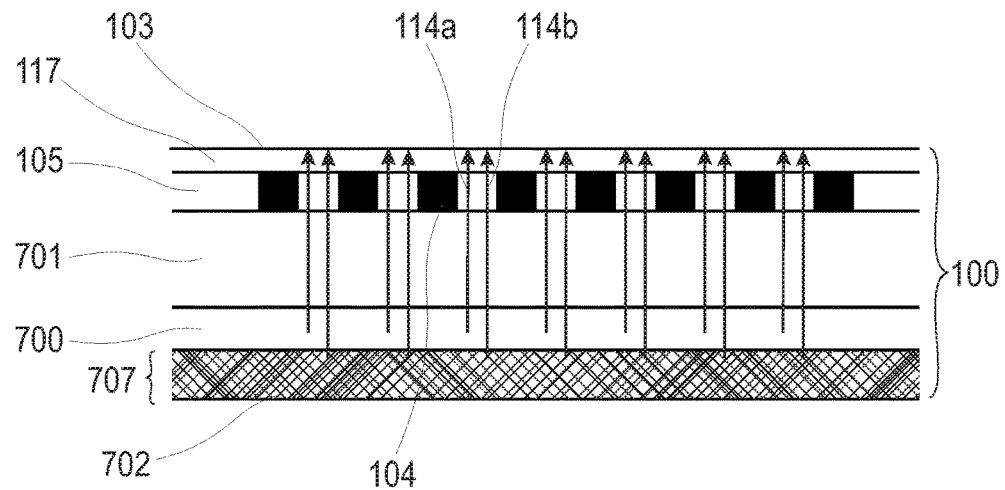
FIGS. 11a-b a preferred embodiment example in which an additional, secondary light-emitting unit for further wavelength ranges (e.g., for the UV range or IR range) is arranged in addition to the primary light-emitting layer for wavelengths in the visible spectral range.
Figure 11B:
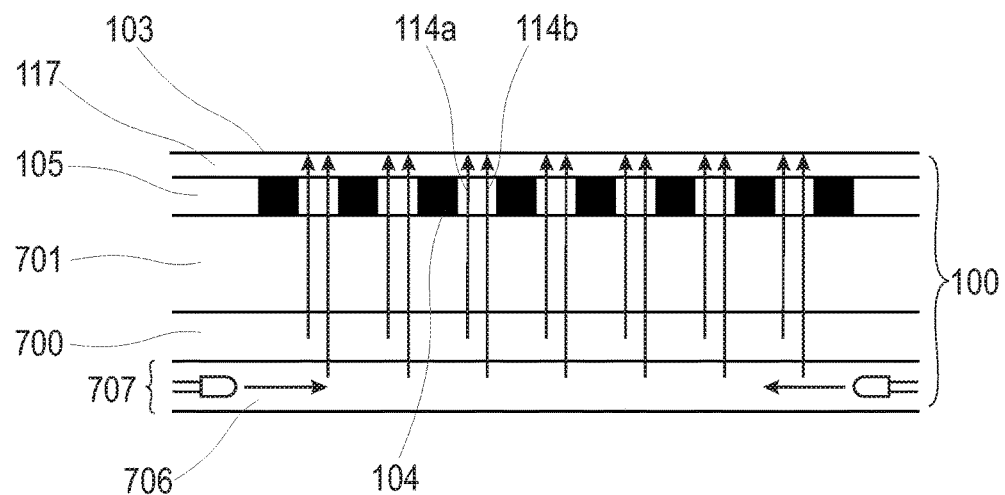

FIG. 11a and FIG. 11b show particularly preferred embodiment examples, specifically for detection of falsification of objects such as live autopodia 102 and documents 118. Compared to the basic arrangement in FIG. 1b, these layer bodies 100 contain at least one additional secondary light-emitting unit 707. This arrangement, in addition to enabling illumination of the object with portions of the primary light-emitting layer 700 which are generally in the visible wavelength range, allows illumination in other wavelength ranges, e.g., IR or UV. This illumination can be switched on as an alternative to, or in addition to, the primary illumination.

Documents have security features, for example, which require illumination in the UV range and IR range to verify them. Live autopodia 102 in turn have fundamentally different light-conducting and scattering characteristics in different wavelength ranges (for example, UV, blue, red, IR). In both cases, falsifications can be detected in a simple manner by recording comparison images with illumination with specific wavelength ranges. All of the layers of the layer body 100 which are located between the additional secondary light-emitting unit 707 and the placement surface 103 must be substantially transparent for the wavelength spectrum of this secondary light-emitting unit 707. If the primary light-emitting layer 700 lies between the secondary light-emitting unit 707 and if the primary light-emitting layer 700 is outfitted with a locally switching layer 703, a structured illumination is also possible by means of the additional secondary light-emitting unit 707. The possibilities for detecting falsification are further improved in this way. For example, an autopodium 102 can be illuminated point-by-point selectively and the light propagation in the autopodium 102 can be captured via the sensor. With documents 118, specific security features can be illuminated individually point by point for verification.

FIG. 11a shows a layer body 100 which comprises an additional secondary light-emitting unit 707 for detecting falsification which is in the form of a photoluminescent foil 702.

FIG. 11b shows a layer body 100 in which an additional secondary light-emitting unit 707 is arranged in the form of a light-conducting layer 706.

Figure 12:
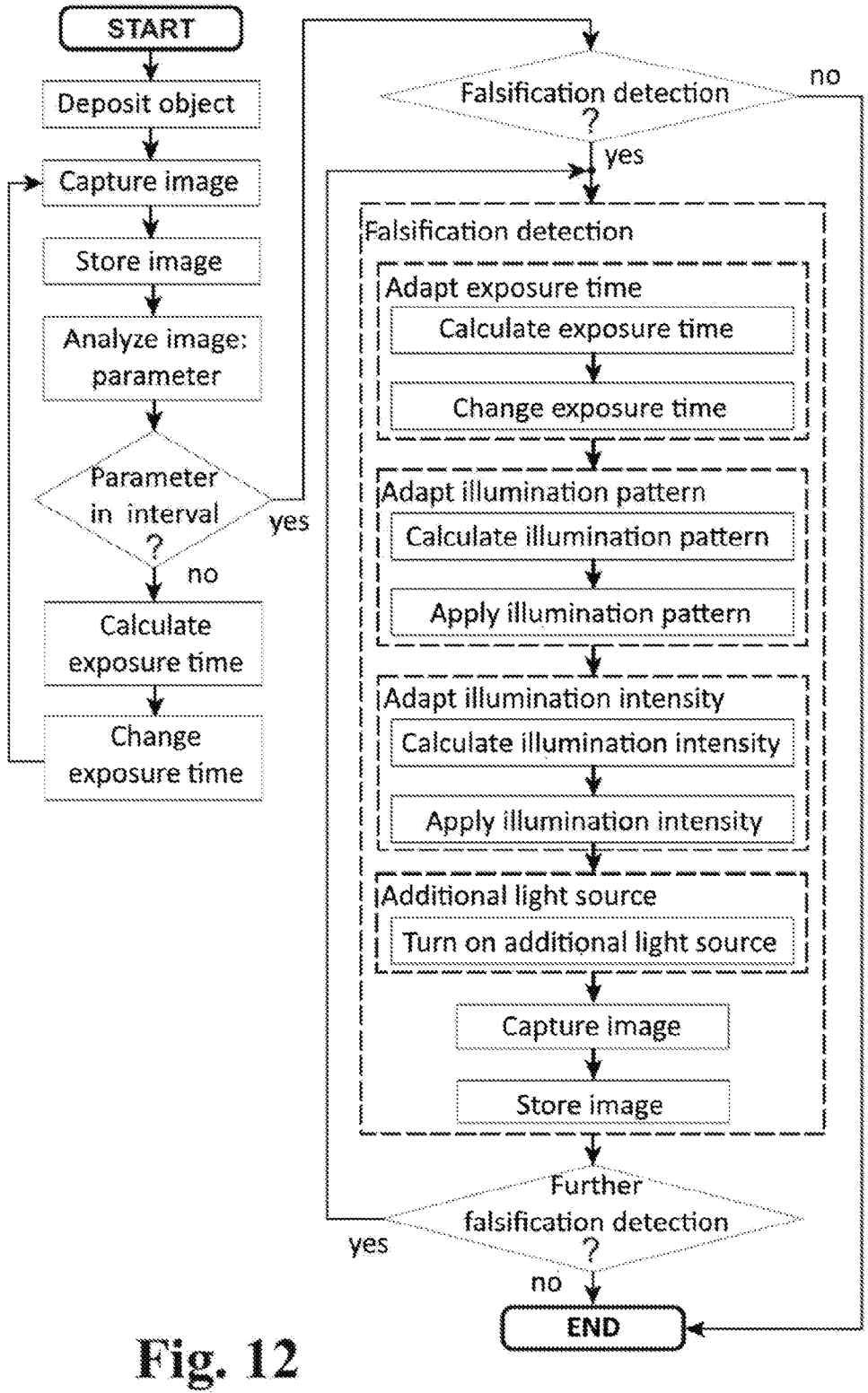
FIG. 12 a preferred method in which, in addition to the image capture with optimal exposure time, a further image capture is carried out for detecting falsification.

FIG. 12 shows, as a particularly preferred embodiment example, a method basically the same as that in FIG. 5, but in this case with additional detection of falsification of objects such as live autopodia 102 or documents 118. For detection of falsification there are various possible adaptations which can be carried out optionally and in any sequence with respect to one another: adapting exposure time, adapting illumination pattern, adapting illumination intensity, switching additional light source(s) on and off. After all adaptations have been performed, image capture and image storage take place. The stored image, referring to the basic method described in FIG. 5, is an additional image and does not replace the previously captured image in the storage. The recording of a plurality of images with different adaptations is possible, for example, an image with switched on UV illumination and a further image with switched on IR illumination to be stored separately.

Mobile Application of the Invention

FIGS. 13a-d show a particularly preferred embodiment example of the device according to the invention for use thereof in mobile applications.

In this case, the layer body 100 according to the invention is slightly modified in that the primary light-emitting layer 700 is not initially provided at the layer body 100 because the primary light-emitting layer 700 can be replaced by the usually very light-intensive display 802 of a mobile device, for example, a tablet computer or smartphone. To this end, the reduced layer body 100 is connected to the mobile device in that the layer body 100 with its transparent substrate layer 701 below lies on the display 802 of the mobile device, and the mobile device is also used to display information directly on the placement surface 103 of the layer body 100. When recording fingerprints, for example, silhouettes 904 of autopodia 102 can be displayed to facilitate the correct positioning thereof intuitively as is shown in FIGS. 13a and 13b.

Further, the mobile device supplies the required illumination of the object, in this example, an autopodium. Accordingly, the display 802 of the mobile device functions as a particular embodiment form of the primary light-emitting layer 700. Further, the device according to the invention is connected to the mobile device for data exchange. This connection can be effected via a conventional cable-connected computer interface such as a USB, for example, or also wirelessly, for example, by means of WLAN or Bluetooth.

Figure 13A:
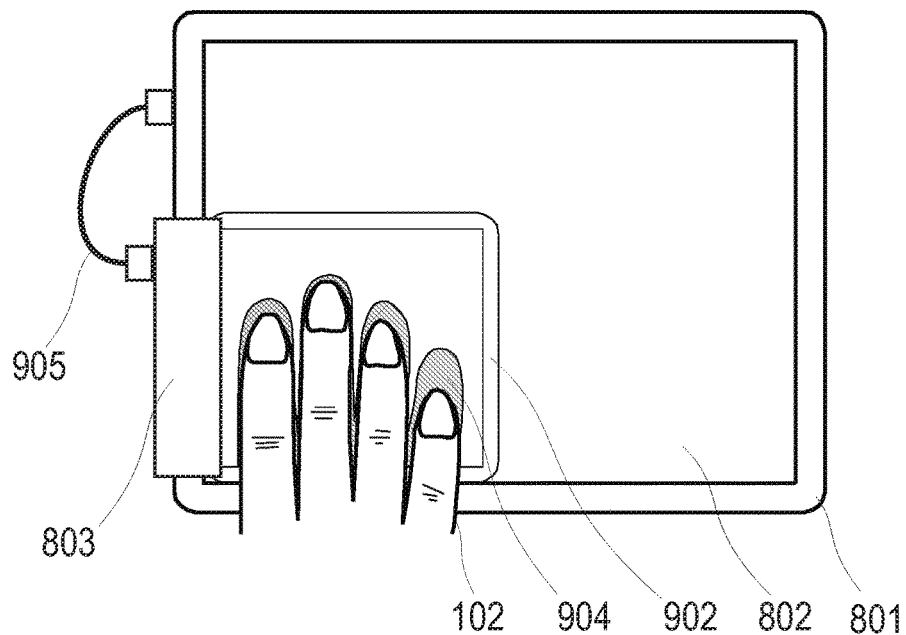
FIGS. 13a-d show preferred embodiment examples for the use of a mobile communications device as illumination and communications device—(a) tablet computer in a top view with deposited device according to the invention and (b) in cross section and (c) smartphone in a top view with deposited device according to the invention and (d) in cross section.

FIG. 13a shows the device according to the invention connected to a tablet computer. The device according to the invention is located directly on the display 802 of the tablet computer.

Figure 13B:
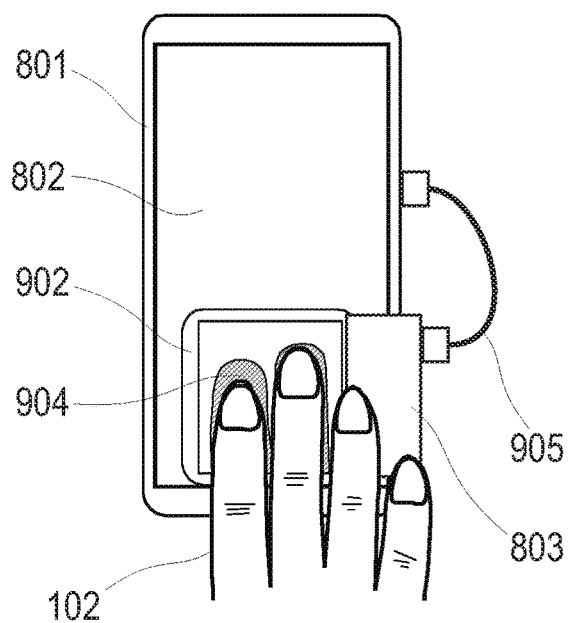

FIG. 13b shows the device according to the invention connected to a smartphone. The device according to the invention is located directly on the display 802 of the smartphone.

Figure 13C:
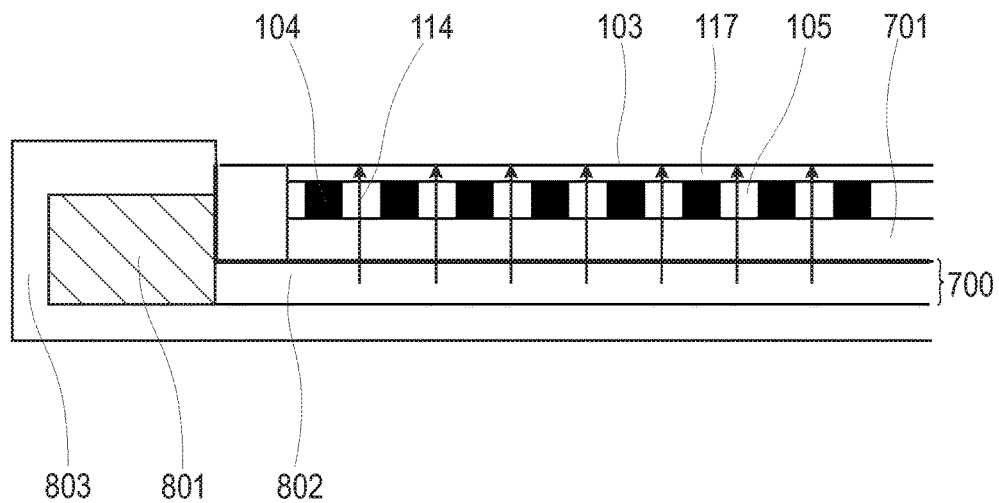

FIG. 13c shows the cross section of the overall system comprising the device according to the invention and the mobile device. The mechanical connection is carried out in this case via a fastening arrangement 803.

Figure 13D:
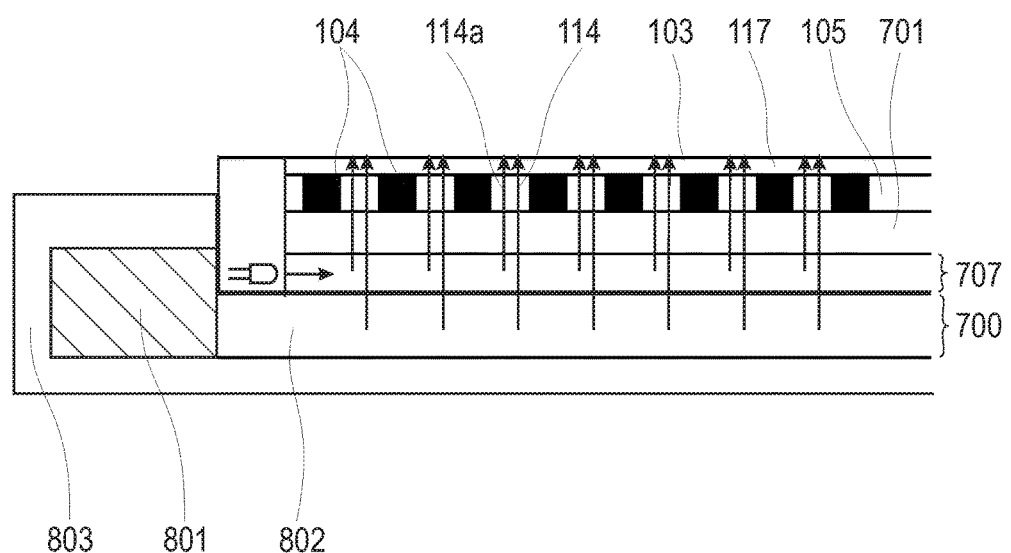

FIG. 13d shows the cross section of the overall system comprising the device according to the invention and the mobile device. Compared with FIG. 13c, an additional secondary light-emitting unit 707 is disposed in the layer construction for detecting falsification. This secondary light-emitting unit 707 is transparent to the illumination of the display 802 of the mobile device so that the latter can display information on the placement surface 103 substantially unobstructedly and can illuminate the object to be recorded. The mechanical connection is carried out in this case via a fastening arrangement 803 shown in FIG. 13c.

LIST OF REFERENCE NUMERALS 100 layer body
101 ambient light
102 autopodium
103 placement surface
104 light-sensitive elements
105 sensor layer (with light-sensitive elements)
105a transmitter/receiver layer (with light-sensitive and light-transmitting elements)
106 portions of the ambient light 101 (with wavelengths of less than 600 nm)
107 scattered light of the illumination
107a scattered light coupled in via a dermal ridge
107b scattered light coupled in via a dermal valley
108 portions of the ambient light 101 (with wavelengths of greater than 600 nm)
110 scattered ambient light 101 (with wavelengths of greater than 600 nm)
112 portion of the ambient light 101 that is detected
113 portion of the illumination light that is detected
113a portion of illumination scattered in the dermal ridge and detected
113b portion of illumination scattered in the dermal valley and not detected
113c portion of illumination scattered in the dermal valley and detected
114 illumination light with primary light-emitting layer 700
114a portion of light that illuminates the dermal ridges
114b portion of light that illuminates the dermal valleys
114c illumination light of the secondary light-emitting unit
115 scattered ambient light 101 (with wavelengths of less than 600 nm)
116 area (of the placement surface 103) (contacted by the object)
117 protective layer
118 document
501 CTF for a distance of 20 µm
502 CTF for a distance of 40 µm
503 CTF for a distance of 60 µm
504 FBI requirements
700 primary light-emitting layer
701 transparent substrate layer
702 photoluminescent foil
703 locally switchable layer
704 cold cathode tube
705 LED or OLED arrangement 706 light-conducting layer
802 display of a mobile device
803 fastening arrangement
902 frame
904 silhouette of the autopodia 102
905 connection cable
906 display surface

What is claimed is:

1. A device for direct optical recording of a security-related object without optically imaging elements, the device comprising:
    a placement surface for depositing the object, and a sensor layer disposed under the object on a substrate layer transparent at least in a visible wavelength range;
    the sensor layer having light-sensitive elements in a two-dimensional pixel grid and being disposed in a layer body with a circuitry based on thin film transistor (TFT) electronics;
    a light source being a primary light-emitting layer for illuminating the object with at least light portions of the primary light-emitting layer from a direction of the sensor layer through the placement surface, wherein all layers of the layer body disposed between the primary light-emitting layer and the placement surface transmit at least portions of light in the visible wavelength range;
    the light-sensitive elements of the sensor layer being disposed at a distance of less than a mean pixel spacing from the object on the placement surface, the mean pixel spacing being defined by the two dimensional pixel grid;
    the light sensitive elements each having a control unit disposed within the sensor layer for controlling an exposure time to obtain an image captured with a predefined exposure time;
a shutter for changing the exposure time by changing a shutter setting of the light sensitive elements in the sensor layer if an overexposure or underexposure has been determined;
    a storage for storing the image and for storing a resulting image when no further change of the exposure time is needed; and
    an internal computing device for analyzing the image at least for overexposure or underexposure, for determining whether a further iteration is needed to change the exposure time, and for further evaluating illumination intensity and adapting the illumination intensity of the primary light-emitting layer below the placement surface if an underexposure or overexposure of the object is determined;
    wherein the security-related object is selected from the groups consisting of personal identification documents, passports or driver's licenses and single-fingerprints, multiple finger prints and handprints.

2. The device according to claim 1, wherein the control unit for controlling the exposure time is formed as a rolling shutter.

3. The device according to claim 1, wherein the control unit for controlling the exposure time is formed as a global shutter.

4. The device according to claim 1, wherein the control unit for controlling the exposure time is constructed in such a way that an exposure time of different pixels or pixel groups can be adjusted differently for the same recording.

5. The device according to claim 1, wherein a cold cathode tube or a photoluminescent foil is disposed under the sensor layer as the primary light-emitting layer.

6. The device according to claim 1, wherein the primary light-emitting layer comprises a grid-based two-dimensional arrangement of singular light-emitting diodes selected from the group consisting of LEDs, OLEDs, and QLEDs, the grid-based two-dimensional arrangement being disposed below the sensor layer.

7. The device according to claim 1, wherein the primary light-emitting layer comprises a regular two-dimensional arrangement of singular light-emitting diodes selected from the groups consisting of LEDs, OLEDs, and QLEDs, the regular two-dimensional arrangement being disposed inside the sensor layer.

8. The device according to claim 1, wherein the primary light-emitting layer has a first wavelength spectrum, and wherein at least one secondary light-emitting unit has at least one second wavelength spectrum not identical to the first wavelength spectrum, the at least one secondary light-emitting unit being switchable as an alternative to the primary light-emitting layer for recording at least one comparison image for detecting falsification in fingerprint recordings, or handprint recordings, or for a verification of security features in document recordings at different comparison wavelengths in each instance.

9. The device according to claim 1, wherein the primary light-emitting layer is replaced as primary light source by a light-radiating display of a mobile communications device selected from the group consisting of smartphones, tablet computers and laptops.

10. The device according to claim 8, wherein the secondary light-emitting unit is disposed between the primary light-emitting layer and the placement surface, the secondary light-emitting unit comprising:
    at least one light source selected from the group consisting of LEDs, OLEDs, and
    at least one light-conducting layer,
    wherein the secondary light-emitting unit is extensively transparent to the light of the display of a mobile communications device.

11. A device for direct optical recording of a security-related object without optically imaging elements, the device comprising:
    an ambient light source for illumination the object;
    a placement surface for depositing the object;
    a sensor layer disposed under the placement surface, the sensor layer being implemented in a layer body with a circuitry based on thin film transistor (TFT) electronics;
    the sensor layer having light-sensitive elements disposed in a two-dimensional pixel grid, the light-sensitive elements of the sensor layer being disposed at a distance of less than a mean pixel spacing from the object to be recorded on the placement surface, the mean pixel spacing being defined by the pixel grid of the sensor layer;
    the light sensitive elements each having a control unit disposed within the sensor layer for controlling an exposure time to obtain an image captured with a predefined exposure time;
    a shutter for changing the exposure time by changing a shutter setting of the light sensitive elements in the sensor layer if an overexposure or underexposure has been determined;
    a storage for storing the image and for storing a resulting image when no further change of the exposure time is needed; and
    an internal computing device for analyzing the image at least for overexposure or underexposure, for determining whether a further iteration is needed to change the exposure time, and for further evaluating illumination intensity and adapting the illumination intensity of the ambient light source if an underexposure or overexposure of the object is determined;

wherein the security-related object is selected from the groups consisting of personal identification documents, passports or driver's licenses and single-fingerprints, multiple finger prints, and handprints.

12. A method for direct optical recordings of a security-related object without optically imaging elements, the method comprising the following steps:

depositing the object on a placement surface;

capturing an image with a predefined exposure time and storing the image;

analyzing the image at least with respect to overexposure or underexposure;

changing the exposure time by changing a shutter setting of the light-sensitive elements in the sensor layer if an overexposure or underexposure has been determined at the analyzing step, again capturing an image, storing the image and analyzing the image for overexposure or underexposure to determine whether a further iteration is needed to change the exposure time;

storing a captured image as a resulting image when the analyzing step makes further change of the exposure time unnecessary; and evaluating illumination intensity as a further image analyzing step and carrying out adapting the illumination intensity of a primary light-emitting layer below the placement surface if an underexposure or overexposure of the object is determined;

wherein the security-related object is selected from the groups consisting of personal identification documents, passports or driver's licenses and single-finger prints, multiple-finger prints, and hand prints.

13. The method according to claim 12, further comprising:

evaluating homogeneity of image lighting during the image analyzing step;

controlling a primary light-emitting layer to emit locally adapted illumination intensity depending on determined inhomogeneities if a local overexposure or underexposure is determined at least in portions of the image recording of the object; and capturing a further image at said locally adapted illumination intensity to reduce or compensate for inhomogeneities of the image lighting in the resulting image.

14. The method according to claim 12, further comprising:

carrying out the method multiple times during illumination of the object with different illumination wavelengths;

storing a plurality of individual images with different spectral range and optimized exposure time in each instance individually; and superimposing the plurality of individual images to form a multicolor total image by image processing.

15. The method according to claim 12, further comprising recording and separately storing additional image captures in a UV range and an IR range for checking security features of the objects.

16. The method according to claim 12, further comprising:

recording additional image captures during illumination with narrowband secondary light-emitting units in different spectral regions for checking falsification of fingerprints or handprints;

storing the additional image captures as comparison images; and comparing the additional image captures to one another or to reference recordings.

17. A method for direct optical recordings of at least one security-related object, the method comprising the following steps:

depositing the object on the placement surface;

capturing and storing at least two images of the object with different exposure times; and superposing the at least two images to calculate a resulting image with improved contrast and improved dynamic range;

wherein the at least one security-related object is selected from the groups consisting of personal identification documents, passports and driver's licenses and fingerprints and handprints.

* * * * *